United States Patent
Zhang et al.

(10) Patent No.: US 11,172,229 B2
(45) Date of Patent: Nov. 9, 2021

(54) AFFINE MOTION COMPENSATION WITH LOW BANDWIDTH

(71) Applicant: QUALCOMM Incorporated, San Diego, CA (US)

(72) Inventors: Kai Zhang, San Diego, CA (US); Wei-Jung Chien, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/244,843

(22) Filed: Jan. 10, 2019

(65) Prior Publication Data

US 2019/0222865 A1    Jul. 18, 2019

Related U.S. Application Data

(60) Provisional application No. 62/617,005, filed on Jan. 12, 2018.

(51) Int. Cl.
*H04N 19/615* (2014.01)
*H04N 19/52* (2014.01)
(Continued)

(52) U.S. Cl.
CPC ......... *H04N 19/615* (2014.11); *H04N 19/105* (2014.11); *H04N 19/119* (2014.11);
(Continued)

(58) Field of Classification Search
CPC .. H04N 19/615; H04N 19/119; H04N 19/176; H04N 19/51
See application file for complete search history.

(56) References Cited

U.S. PATENT DOCUMENTS

| | | | | |
|---|---|---|---|---|
| 2006/0193386 A1* | 8/2006 | Lin | ...................... | H04N 19/103 375/240.16 |
| 2011/0310976 A1* | 12/2011 | Wang | ..................... | H04N 19/46 375/240.24 |

(Continued)

OTHER PUBLICATIONS

Jianle Chen, Algorithm Description of Joint Exploration Test Model 6 (JEM 6), Mar. 31-Apr. 7, 2017 (Year: 2017).*

(Continued)

*Primary Examiner* — Hesham K Abouzahra
(74) *Attorney, Agent, or Firm* — Qualcomm Incorporated

(57) ABSTRACT

An example device for coding video data is configured to determine that a block of the video data includes a plurality of sub-blocks, each of the sub-blocks having respective motion information referring to respective reference blocks in a reference picture in a memory, determine a single reference block of the reference picture, the single reference block including each of the respective reference blocks, wherein determining the single reference block comprises: determine four corner sub-blocks of the block included in the plurality of sub-blocks; and determine the single reference block according to the respective motion information for the four corner sub-blocks such that corners of the single reference block correspond to corners of the respective reference blocks of the four corner sub-blocks, retrieve data of the single reference block from the reference picture, and predict the sub-blocks from the respective reference blocks using the data of the single reference block.

30 Claims, 18 Drawing Sheets

(51) Int. Cl.

| | |
|---|---|
| *H04N 19/433* | (2014.01) |
| *H04N 19/105* | (2014.01) |
| *H04N 19/139* | (2014.01) |
| *H04N 19/119* | (2014.01) |
| *H04N 19/176* | (2014.01) |
| *H04N 19/51* | (2014.01) |

(52) U.S. Cl.
CPC ......... *H04N 19/139* (2014.11); *H04N 19/176* (2014.11); *H04N 19/433* (2014.11); *H04N 19/51* (2014.11); *H04N 19/52* (2014.11)

(56) References Cited

U.S. PATENT DOCUMENTS

| | | |
|---|---|---|
| 2017/0332095 A1 | 11/2017 | Zou et al. |
| 2018/0098063 A1 | 4/2018 | Chen et al. |
| 2019/0104319 A1 | 4/2019 | Zhang et al. |
| 2019/0110064 A1 | 4/2019 | Zhang et al. |

OTHER PUBLICATIONS

Lin et al., Motion Vector Coding in the HEVC Standard, IEEE Journal of Selected Topics in Signal Processing, vol. 7, No. 6, Dec. 2013 (Year: 2013).*

Chen J., et al., "Algorithm description of Joint Exploration Test Model 6 (JEM6)", 6. JVET Meeting; Mar. 31, 2017-Jul. 4, 2017; Hobart; (The Joint Video Exploration Team of ISO/IEC JTC1/SC29/WG11 and ITU-T SG.16); URL: http://phenix.int-evry.fr/jvet/, No. JVET-F1001, May 31, 2017 (May 31, 2017), XP030150793, p. 17-p. 28. . . .

Chen J., et al., "Algorithm Description of Joint Exploration Test Model 3", Document: JVET-C1001 v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

Co-Pending U.S. Appl. No. 16/188,774, filed Nov. 13, 2018.

Ergen S., "ZigBee/IEEE 802.15.4 Summary", Sep. 10, 2004, 37 pp.

Flynn D., et al., "HEVC Range Extensions Draft 6", 16. JCT-VC Meeting; Sep. 1, 2014-Jan. 17, 2014; San Jose (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC-P1005-v4, Apr. 3, 2014 (Apr. 3, 2014), 356 Pages XP030115878.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/013194—ISA/EPO—dated Mar. 14, 2019—16 pp.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Lin Y-C., et al., "CE10.2.3: Subblock OBMC with uni-prediction-based OBMC at CU boundaries", 125. MPEG Meeting; Jan. 14, 2019-Jan. 18, 2019; MARRAKECH; (Motion Picture Expert Group or ISO/IEC JTC1/SC29/WG11), No. m45446, Jan. 7, 2019 (Jan. 7, 2019), XP030198502, Retrieved from the Internet: URL:http://phenix.int-evry.fr/mpeg/doc_end_user/documents/125_Marrakech/wg11/m45446-JVET-M0180-v2-JVET-M0180-v2.zip JVET-M0180_DraftText.docx [retrieved-on Jan. 7, 2019] p. 125-p. 176.

Wang., et al., "High Efficiency Video Coding (HEVC) Defect Report 2," Joint Collaboration Team of Video Coding, ITU-T SG 16 WP 3 and ISO/IEC JTC 1/SC 29/WG 11, 15th Meeting, Geneva, CH, Oct. 23-Nov. 1, 2013, Document: JCTVC-O1003_V2, 311 pages.

Xiu X., et al., "Description of SDR, HDR and 360° Video Coding Technology Proposal by InterDigital Communications and Dolby Laboratories", 10. JVET Meeting; Oct. 4, 2018-Apr. 20, 2018; San Diego; (The Joint Video Exploration Team of ISO/IEC JTC1/SC29/WG11 and ITU-TSG.16); URL:http://phenix.int-evry.fr/jvet/, No. JVET-J0015, Apr. 3, 2018 (Apr. 3, 2018), XP030151174, p. 7-p. 10.

Zhou (Broadcom) M: "CE2-related: A Restriction on Memory Bandwidth Consumption of Affine Mode", 13. JVET Meeting; Jan. 9, 2019-Jan. 18, 2019; MARRAKECH; (The Joint Video Exploration Team of ISO/IEC JTC1/SC29/WG11 and ITU-TSG.16), No. JVET-M0049, Dec. 28, 2018 (Dec. 28, 2018), XP030200078, 7 Pages, Retrieved from the Internet: URL: http://phenix.int-evry.fr/jvet/doc_end_user/documents/13_Marrakech/wg11/JVET-M0049-v1.zip JVET-M0049-v.docx [retrieved on Dec. 28, 2018].

* cited by examiner

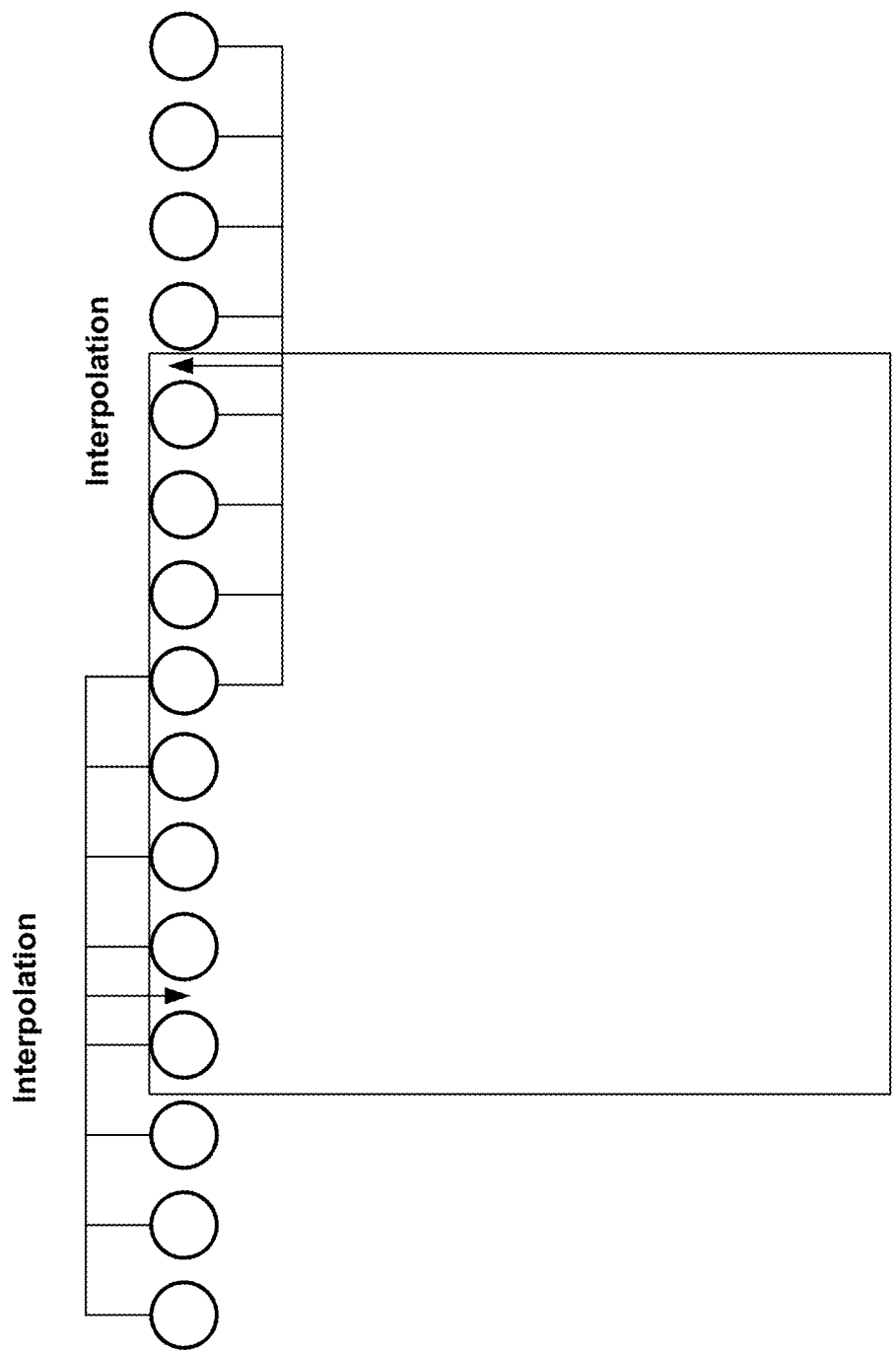

AFFINE MOTION COMPENSATION WITH LOW BANDWIDTH

This application claims the benefit of U.S. Provisional Application No. 62/617,005, filed Jan. 12, 2018, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC), standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes examples of techniques related to inter-picture prediction, such as techniques for affine motion compensation with low bandwidth. Such techniques may be applied to existing video coding standards such as the H.265, High Efficiency Video Coding (HEVC), video coding standard, or future video coding standards such as the upcoming H.266 standard. Sub-block motion compensation allows a block to be divided into multiple sub-blocks with different motion vectors for a reference picture list. The sub-block motion compensation may increase the bandwidth burden due to the interpolation procedure. According to the present techniques, bandwidth for retrieving reference blocks in affine motion compensation may be reduced by reducing the size of samples to be fetched from the reference picture.

In one example, a method of coding video data includes determining that a block of video data includes a plurality of sub-blocks, each of the sub-blocks having respective motion information referring to respective reference blocks in a reference picture, determining a single reference block of the reference picture, the single reference block including each of the respective reference blocks, wherein determining the single reference block comprises: determining four corner sub-blocks of the block included in the plurality of sub-blocks; and determining the single reference block according to the respective motion information for the four corner sub-blocks such that corners of the single reference block correspond to corners of the respective reference blocks of the four corner sub-blocks, retrieving data of the single reference block from the reference picture, and predicting the sub-blocks from the respective reference blocks using the data of the single reference block.

In another example, a device for coding video data includes a memory configured to store video data; and a processing unit implemented in circuitry and configured to: determine that a block of the video data includes a plurality of sub-blocks, each of the sub-blocks having respective motion information referring to respective reference blocks in a reference picture stored in the memory; determine a single reference block of the reference picture, the single reference block including each of the respective reference blocks, wherein determining the single reference block comprises: determine four corner sub-blocks of the block included in the plurality of sub-blocks; and determine the single reference block according to the respective motion information for the four corner sub-blocks such that corners of the single reference block correspond to corners of the respective reference blocks of the four corner sub-blocks; retrieve data of the single reference block from the reference picture in the memory; and predict the sub-blocks from the respective reference blocks using the data of the single reference block.

In another example, a device for coding video data includes means for determining that a block of video data includes a plurality of sub-blocks, each of the sub-blocks having respective motion information referring to respective reference blocks in a reference picture; means for determining a single reference block of the reference picture, the single reference block including each of the respective reference blocks, wherein the means for determining the single reference block comprises: means for determining four corner sub-blocks of the block included in the plurality of sub-blocks; and means for determining the single reference block according to the respective motion information for the four corner sub-blocks such that corners of the single reference block correspond to corners of the respective reference blocks of the four corner sub-blocks; means for retrieving data of the single reference block from the reference picture; and means for predicting the sub-blocks from the respective reference blocks using the data of the single reference block.

In another example, a computer-readable storage medium has stored thereon instructions that, when executed, cause a processor of a device for decoding video data to: determine that a block of video data includes a plurality of sub-blocks, each of the sub-blocks having respective motion information referring to respective reference blocks in a reference picture; determine a single reference block of the reference picture, the single reference block including each of the respective reference blocks, wherein determining the single reference block comprises: determine four corner sub-blocks of the block included in the plurality of sub-blocks; and determine the single reference block according to the respective motion information for the four corner sub-blocks such that corners of the single reference block correspond to corners of the respective reference blocks of the four corner sub-blocks; retrieve data of the single reference block from the reference picture; and predict the sub-blocks from the respective reference blocks using the data of the single reference block.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 8 is a conceptual diagram illustrating an example of required samples in the reference picture in the interpolation procedure.

DETAILED DESCRIPTION

Figure 1:
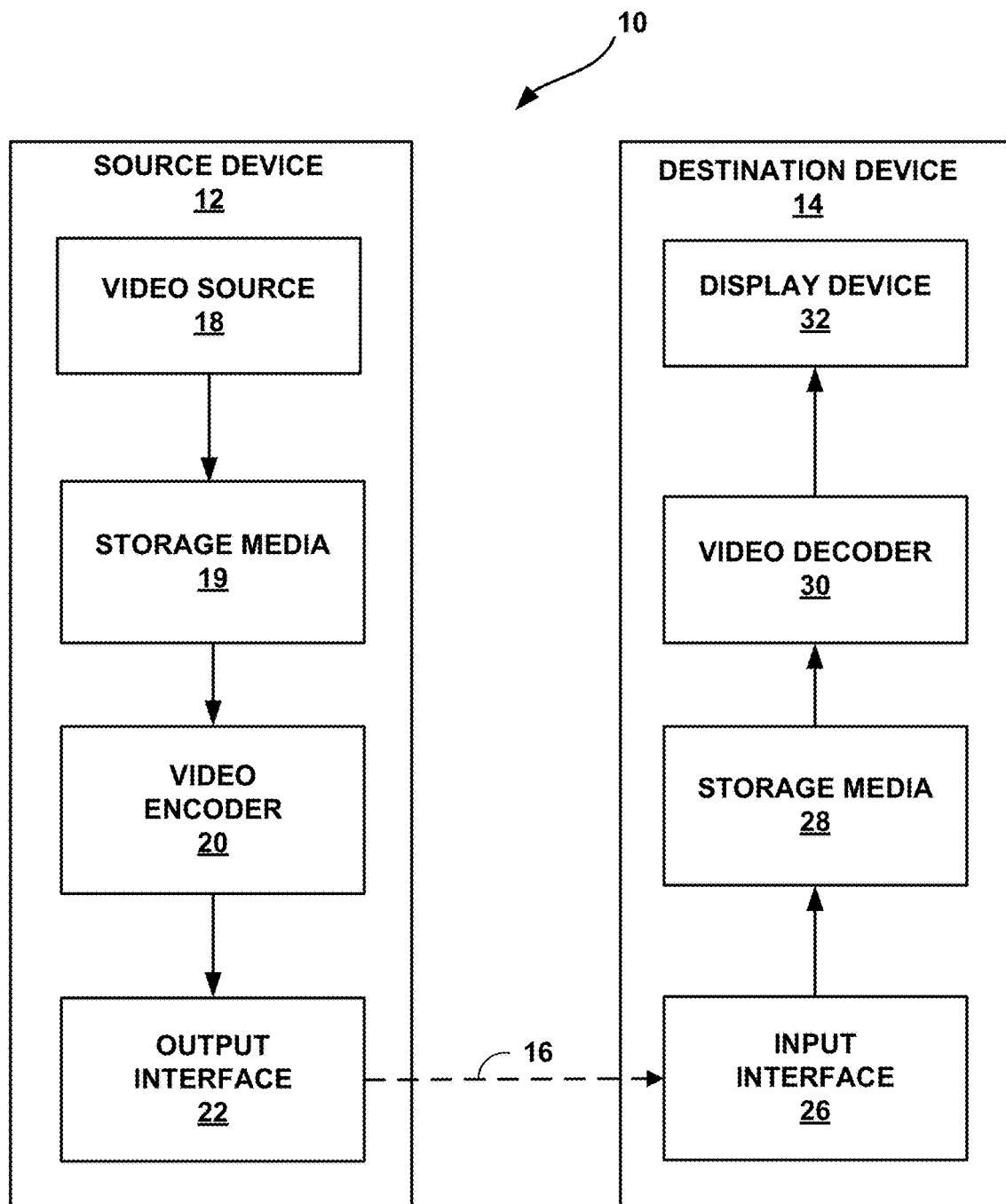
FIG. 1 is a block diagram illustrating an example video encoding and decoding system that may use one or more techniques described in this disclosure.

FIG. 1 is a block diagram illustrating an example video encoding and decoding system 10 that may use techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider.

As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 22 may output the encoded video information to a computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

High-Efficiency Video Coding (HEVC) by the Joint Collaboration Team on Video Coding (JCT-VC) of ITU-T Video Coding Experts Group (VCEG) and ISO/IEC Motion Picture Experts Group (MPEG) is another example video coding standard. The latest HEVC draft specification, and referred to as HEVC WD hereinafter, is available from phenix.int-evry.fr/jct/doc_end_user/documents/15_Geneva/wg11/JCTVC-O1003-v2.zip. The HEVC standard is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2015.

The Range Extensions to HEVC, namely HEVC-Rext, are also developed by the JCT-VC. A recent Working Draft (WD) of Range extensions, referred to as RExt WD6 hereinafter, is available from phenix.int-evry.fr/jct/doc_end_user/documents/16_San%20Jose/wg11/JCTVC-P1005-v1.zip.

Recently, investigation of new coding tools for future video coding are undergoing (studied in JVET—Joint Video Exploration Team), and technologies that improve the coding efficiency for video coding have been proposed. There is evidence that significant improvements in coding efficiency can be obtained by exploiting the characteristics of video content, especially for the high resolution content like 4K, with novel dedicated coding tools beyond H.265/HEVC.

For example, ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The latest version of reference software, i.e., Joint Exploration Test Model 3 (JEM 3), could be downloaded from: jvet.hhi.fraunhofer.de/svn/svn_HMJEMSoftware/tags/HM-16.6-JEM-3.0/. A document, J. Chen, E. Alshina, G. J. Sullivan, J.-R. Ohm, J. Boyce, "Algorithm Description of Joint Exploration Test Model 3", JVET-C1001, May, 2016 (hereinafter, "JVET-C1001"), includes an algorithm description of Joint Exploration Test Model 3 (JEM3).

In HEVC and other video coding specifications, video data includes a series of pictures. Pictures may also be referred to as "frames." A picture may include one or more sample arrays. Each respective sample array of a picture may comprise an array of samples for a respective color component. In HEVC, a picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements presented together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a CU of a current picture, video encoder 20 may generate the predictive block of the CU based on decoded samples of a reference picture (i.e., a picture other than the current picture).

In HEVC and other codecs, video encoder 20 encodes a CU using only one prediction mode (i.e., intra prediction or inter prediction). Thus, in HEVC and particular other codecs, video encoder 20 may generate predictive blocks of a CU using intra prediction or video encoder 20 may generate predictive blocks of the CU using inter prediction. When video encoder 20 uses inter prediction to encode a CU, video encoder 20 may partition the CU into 2 or 4 PUs, or one PU corresponds to the entire CU. When two PUs are present in one CU, the two PUs can be half size rectangles or two rectangle sizes with ¼ or ¾ size of the CU. In HEVC, there are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N. When a CU is intra predicted, 2N×2N and N×N are the only permissible PU shapes, and within each PU a single intra prediction mode is coded (while chroma prediction mode is signalled at CU level).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. In some examples, the one or more transforms convert the transform block from a pixel domain to a frequency domain. Thus, in such examples, a transform coefficient may be considered to be in a frequency domain.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, video decoder 30 may use inter prediction or intra prediction to generate one or more predictive blocks for each PU of the current CU may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of coding tree units ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, in HEVC, the largest coding unit in a slice is called a coding tree block (CTB) or coding tree unit (CTU). A CTB contains a quad-tree the nodes of which are coding units. The size of a CTB can range from 16×16 to 64×64 in the HEVC main profile (although technically 8×8 CTB sizes can be supported). A coding unit (CU) could be the same size of a CTB though and as small as 8×8. Each coding unit is coded with one mode. When a CU is inter coded, the CU may be further partitioned into 2 or 4 prediction units (PUs) or become just one PU when further partition does not apply. When two PUs are present in one CU, the PUs can be half size rectangles or two rectangle size with ¼ or ¾ size of the CU. When the CU is inter coded, one set of motion information is present for each PU. In addition, each PU is coded with a unique inter-prediction mode to derive the set of motion information.

In general, in H.265/HEVC, for each block, a set of motion information can be available. A set of motion information contains motion information for forward and backward prediction directions. Here, forward and backward prediction directions are two prediction directions of a bi-directional prediction mode and the terms "forward" and "backward" do not necessarily have a geometry meaning; instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information may contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases where two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

As described above, in HEVC, the largest coding unit in a slice is called a coding tree block (CTB). A CTB contains a quad-tree the nodes of which are coding units.

The size of a CTB can range from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into two prediction units (PUs) or become just one PU when further partition does not apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information. In HEVC, the smallest PU sizes are 8×4 and 4×8.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 2A:
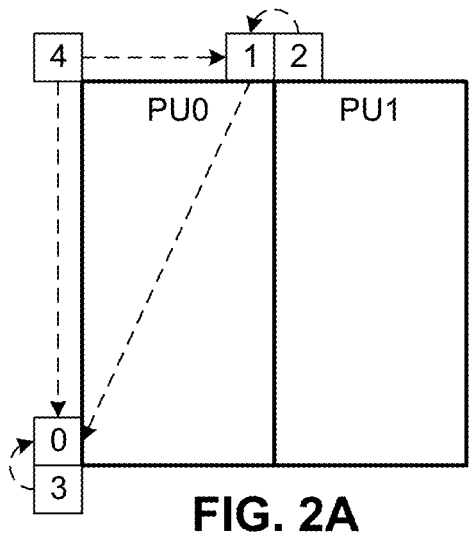
FIGS. 2A and 2B are conceptual diagrams illustrating example neighboring blocks from which motion information can be derived for motion vector prediction.
Figure 2B:
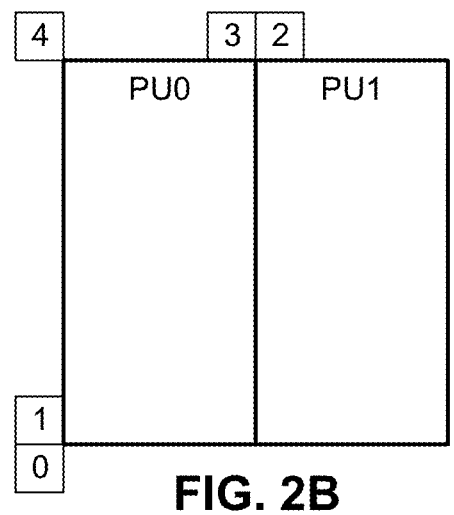

FIGS. 2A and 2B are conceptual diagrams illustrating example neighboring blocks from which motion information can be derived for motion vector prediction. Spatial MV candidates are derived from the neighboring blocks shown in FIGS. 2A and 2B for a specific PU ($PU_0$), although the methods for generating the candidates from the blocks differ for merge and AMVP modes. In merge mode, up to four spatial MV candidates can be derived with the orders showed in FIG. 2A with numbers, and the order is the following: left (0), above (1), above right (2), below left (3), and above left (4), as shown in FIG. 2A. Pruning operations may be applied to remove identical MV candidates.

In AVMP mode, the neighboring blocks are divided into two groups: left group consisting of the block 0 and 1, and above group consisting of the blocks 2, 3, and 4 as shown in FIG. 2B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus, the temporal distance differences can be compensated.

As described above, motion compensation in H.265/HEVC is used to generate a predictor for the current inter-coded block. A quarter pixel accuracy motion vector is used and pixel values at fractional positions are interpolated using neighboring integer pixel values for both luma and chroma components.

In the current existing video codec standards, only a translational motion model is applied for motion compensation prediction (MCP), while in the real world, there are many kinds of motions, e.g. zoom in/out, rotation, perspective motions and the other irregular motions. If only a translation motion model for MCP is applied in such test sequences with irregular motions, the prediction accuracy is affected and results in low coding efficiency.

For many years, many video experts have tried to design many algorithms to improve MCP for higher coding efficiency. Affine prediction is one example way to improve MCP. In affine prediction, a block is divided into a plurality of sub-blocks, and video encoder 20 and video decoder 30 determine motion vectors for each of the sub-blocks. The motion vectors for the sub-blocks may be based on motion vectors for control points. Examples of the control points are one or more corners of the block, but other points are possible options for control points.

Figure 3:
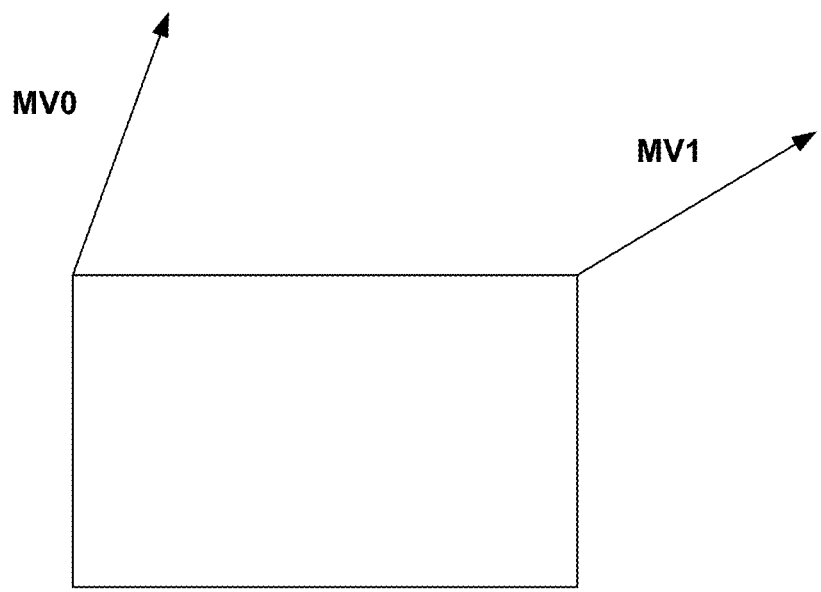
FIG. 3 is a conceptual diagram illustrating an example of affine motion prediction.

FIG. 3 is a conceptual diagram illustrating an example of affine motion prediction. In particular, FIG. 3 depicts a block predicted in affine mode with two motion vectors, MV0 and MV1. Affine merge and affine inter modes are proposed to deal with affine motion models with 4 parameters as $$\begin{cases} mv_x = ax - by + c \\ mv_y = bx + ay + d \end{cases} \quad 1)$$

where $(vx_0, vy_0)$ is the control point motion vector on top left corner, and $(vx_1, vy_1)$ is another control point motion vector on above right corner of the block as shown in FIG. 3. FIG. 3 illustrates a block predicted with two point MV affine with 4 affine parameters. The affine model may be defined as follows $$\begin{cases} mv_x = \frac{(mv_{1x} - mv_{0x})}{w} x - \frac{(mv_{1y} - mv_{0y})}{w} y + mv_{0x} \\ mv_y = \frac{(mv_{1y} - mv_{0y})}{w} x + \frac{(mv_{1x} - mv_{0x})}{w} y + mv_{0y} \end{cases} \quad 2)$$

where w is the width of the block. Using equation (2), video encoder 20 and video decoder 30 may determine the motion vectors for the sub-blocks.

In the current JEM software, the affine motion prediction is only applied to a square block. As a natural extension, the affine motion prediction can be applied to non-square block. Similar to the conventional translation motion coding, two modes (i.e., inter mode with motion information signaled and merge mode with motion information derived) are supported for affine motion coding.

For affine inter mode, for every CU/PU whose size is equal to or larger than 16×16, AF_INTER mode can be applied as follows. If the current CU/PU is in AF_INTER mode, an affine flag in CU/PU level is signalled in the bitstream. An affine motion vector prediction (MVP) candidate list with two candidates as $\{(MVP^0{}_0, MVP^0{}_1), (MVP^1{}_0, MVP^1{}_1)\}$ is built. Rate-distortion cost is used to determine which of $(MVP^0{}_0, MVP^0{}_1)$ or $(MVP^1{}_0, MVP^1{}_1)$ is selected as the affine motion vector prediction of the current CU/PU. If $(MVP^x{}_0, MVP^x{}_1)$ is selected, then $MV_0$ is coded with $MVP^x{}_0$ as the prediction and $MV_0$ is coded with $MVP^x{}_1$ as the prediction. The index to indicate the position of the selected candidate in the list is signalled for the current block in the bit-stream.

Figure 4:
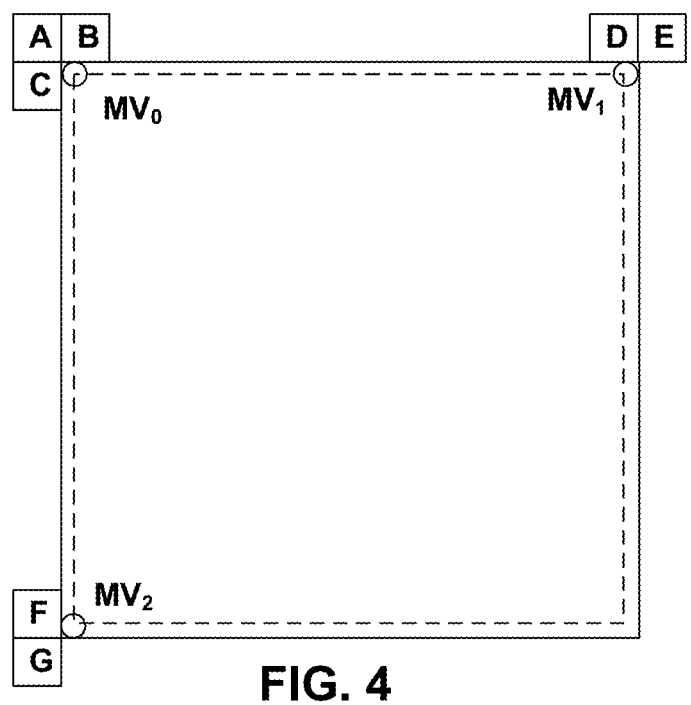
FIG. 4 is a conceptual diagram illustrating an example of neighboring blocks for six parameter affine motion prediction.

FIG. 4 is a conceptual diagram illustrating an example of neighboring blocks for six parameter affine motion prediction. In FIG. 4, a block is predicted using three motion vectors, MV0, MV1, and MV2. MV0 corresponds to an upper-left corner of the block having neighboring blocks A, B, and C. MV1 corresponds to an upper-right corner of the block having neighboring blocks D and E. MV2 corresponds to a lower-left corner of the block having neighboring blocks F and G.

The construction procedure of the affine MVP candidate list is as follows.

Collect MVs from three groups
G0: {MV-A, MV-B, MV-C}, G1: {MV-D, MV-E}, G2 {MV-F, MV-G}. Block A, B, C, D, E, F and G are shown in FIG. 4.

First take the one referring to the target reference picture.

Then the scaling MVs if not referring to that (e.g., none that refer to target reference picture).

For a triple (MV0, MV1, MV2) from G0, G1, G2, derive a MV2' from MV0 and MV1 with the affine model; then the following can be set D(MV0, MV1, MV2)=|MV2−MV2'|

Go through all triples from G0, G1 and G2, find the triple (MV00, MV01, MV02) which produces the minimum D, then set $MVP^0{}_0$=MV00, $MVP^0{}_1$=MV01.

If there are more than one available triple, find the (MV10, MV11, MV12) which produces the second minimum D, then set $MVP^1{}_0$=MV10, $MVP^1{}_1$=MV11.

If the candidates are not fulfilled, the MVP candidates for non-affine prediction block are derived for the current block. For example, the MVP candidates for non-affine prediction block are MVP_nonaff0 and MVP_nonaff1. If ($MVP^1{}_0$, $MVP^1{}_1$) cannot be found from the triple search, then set $MVP^1{}_0$=$MVP^1{}_1$=MVP_nonaff0.

After the MVP of the current affine CU/PU is determined, affine motion estimation is applied and the ($MV^0{}_0$, $MV^0{}_1$) is found. Then, the difference of ($MV^0{}_0$, $MV^0{}_1$) and ($MVP^x{}_0$, $MVP^x{}_1$) is coded in the bit stream.

Affine motion compensation prediction mentioned above is applied to generate the residues of the current CU/PU. Finally, the residues of the current CU/PU are transformed, quantized, and coded into the bit stream as the traditional procedure.

Figure 5B:
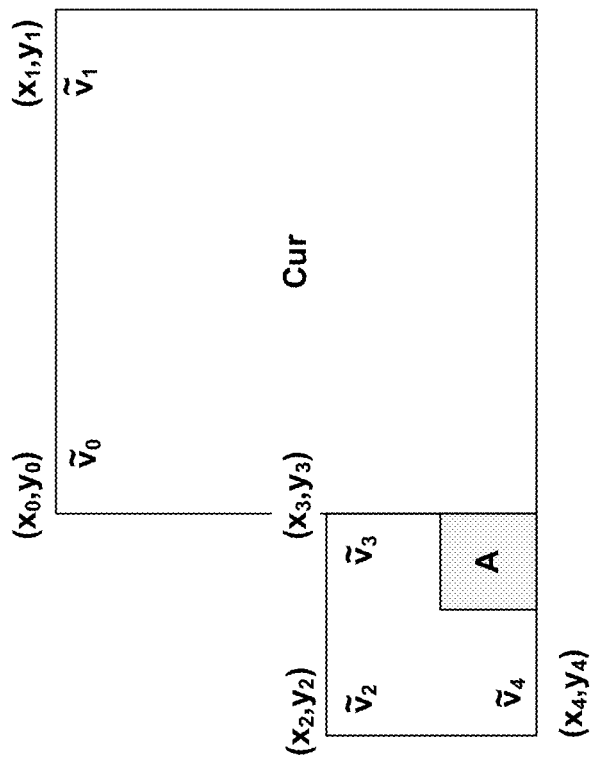
FIGS. 5A and 5B are conceptual diagrams illustrating example candidates for affine merge mode.
Figure 5A:
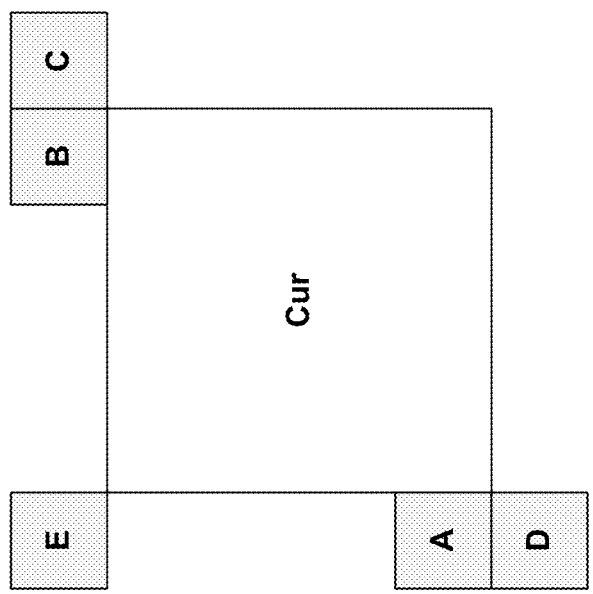

FIGS. 5A and 5B are conceptual diagrams illustrating example candidates for affine merge mode. For affine merge mode, when the current CU/PU is applied in affine merge (AF_MERGE) mode, it gets the first block coded with affine mode from the valid neighbor reconstructed blocks, and the selection order for the candidate block is from left, above, above right, left bottom to above left as shown in FIG. 5A. For example, if the neighbour left bottom block A is coded in affine mode as shown in FIG. 5B, the motion vectors $v_2$, $v_3$, and $v_4$ of the top left corner, above right corner and left bottom corner of the CU/PU, which contains the block A, are derived. The motion vector $v_0$ of the top left corner on the current CU/PU is calculated according to $v_2$, $v_3$, and $v_4$. Similarly, the motion vector $v_1$ of the above right of the current CU/PU is calculated based on $v_2$, $v_3$, and $v_4$.

After the CPMV (control point motion vector) of the current CU/PU $v_0$ and $v_1$ are achieved, according to the simplified affine motion model defined in equation (2), the MVF (motion vector field) of the current CU/PU is generated. Then, Affine MCP is applied as described above (e.g., the motion vector field is the motion vectors of the sub-blocks, and the motion vectors of the sub-blocks identify reference blocks whose difference is used to encode or decode the sub-blocks).

In order to identify whether the current CU/PU is coded with AF_MERGE mode, an affine flag is signalled in the bit stream when there is at least one neighbor block coded in affine mode. If no affine block neighboring the current block exists as shown in FIG. 5A, no affine flag is written in the bit stream.

To indicate the affine merge mode, one affine_flag is signaled if the merge flag is 1. If affine_flag is 1, the current block is coded with the affine merge mode, and no merge index is signaled. If affine_flag is 0, the current block is coded with the normal merge mode, and a merge index is signaled followingly. The table below shows the syntax design.

| | |
|---|---|
| merge_flag | ae |
| if( merge_flag){ | |
|     affine_flag | ae |
|     if(!affine_flag) | |
|         merge_index | ae |
| } | |

In HEVC, context-adaptive binary arithmetic coding (CABAC) is used to convert a symbol into a binarized value. This process is called binarization. Binarization enables efficient binary arithmetic coding via a unique mapping of non-binary syntax elements to a sequence of bits, which are called bins.

In JEM 2.0 (or JEM 3.0) reference software, for affine merge mode, only the affine flag is coded, and the merge index is inferred to be the first available neighboring affine model in the predefined checking order A-B-C-D-E as shown in FIG. 5A.

For the affine inter mode, two MVD syntaxes are coded for each prediction list indicating the motion vector difference between derived affine motion vector and predicted motion vector.

The following describes four-parameter (two motion vectors) affine and six-parameter (three motion vectors) affine. In U.S. application Ser. No. 15/587,044, filed May 4, 2017, and 62/337,301, filed May 5, 2016, the content of which are incorporated by reference, a switchable affine motion prediction scheme is proposed. U.S. application Ser. No. 15/587,044 published as U.S. Patent Publication No. 2017/0332095. A block with affine prediction can choose to use four-parameter affine model or six-parameter affine model adaptively.

An affine model with 6 parameters is defined $$\begin{cases} mv_x = ax + by + e \\ mv_y = cx + dy + f \end{cases} \quad 3)$$

Figure 6:
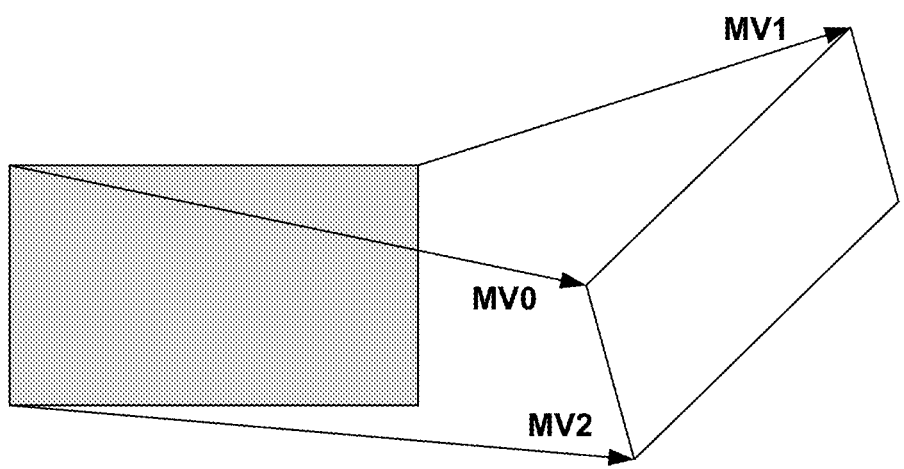
FIG. 6 is a conceptual diagram illustrating an example block predicted using six parameter affine motion information.

FIG. 6 is a conceptual diagram illustrating an example block predicted using six parameter affine motion information. An affine model with 6 parameters has three control points. In other words, an affine model with 6 parameters is determined by three motion vectors as shown in FIG. 6, including MV0, MV1, and MV2. MV0 is the first control point motion vector on top left corner, MV1 is the second control point motion vector on above right corner of the block, and MV2 is the third control point motion vector on left bottom corner of the block, as shown in FIG. 6. The affine model built with the three motion vectors may be calculated as $$\begin{cases} mv_x = \frac{(mv_{1x} - mv_{0x})}{w}x + \frac{(mv_{2x} - mv_{0x})}{h}y + mv_{0x} \\ mv_y = \frac{(mv_{1y} - mv_{0y})}{w}x + \frac{(mv_{2y} - mv_{0y})}{h}y + mv_{0y} \end{cases} \quad 4)$$

There are more motion vector prediction methods for affine. A similar manner as affine-merge to derive the motion vectors of the top left corner and the above right corner as described above for affine merge mode can also be used to derive the MVPs for the top left corner, the above right corner and the below left corner. U.S. application Ser. No. 15/725,052, filed Oct. 4, 2017, and 62/404,719, filed Oct. 5, 2016 relate to deriving MVPs, and are incorporated by reference in their entirety.

MVD1 can be predicted from MVD in the affine mode. U.S. Application Ser. No. 62/570,417, filed Oct. 10, 2017 relates to affine prediction in video coding, such as predicting MVD1 from MVD in affine mode.

Affine merge and normal merge can be unified. An affine merge candidate can be added into the merge candidate list.

U.S. Application Ser. No. 62/586,117, filed Nov. 14, 2017, relates to an affine merge candidate being added into a merge candidate list and is incorporated by reference in its entirety and included as an appendix to this disclosure. U.S. Application Ser. No. 62/567,598, filed Oct. 3, 2017, is related to coding affine prediction motion information and is incorporated by reference in its entirety.

This disclosure describes techniques to generate affine motion vectors from motion vectors of spatial neighboring blocks. The following techniques may be applied individually. Alternatively, any combination of them may be applied. For ease of reference, the techniques are described with respect to a video coder performing the example operations. One example of a video coder is video encoder 20, and another example is video decoder 30. Hence, "video coder" is used to generically refer to video encoder 20 and video decoder 30. Similarly, the term "code" is used to generically refer to encode, when performed by video encoder 20, or decode, when performed by video decoder 30.

Figure 7B:
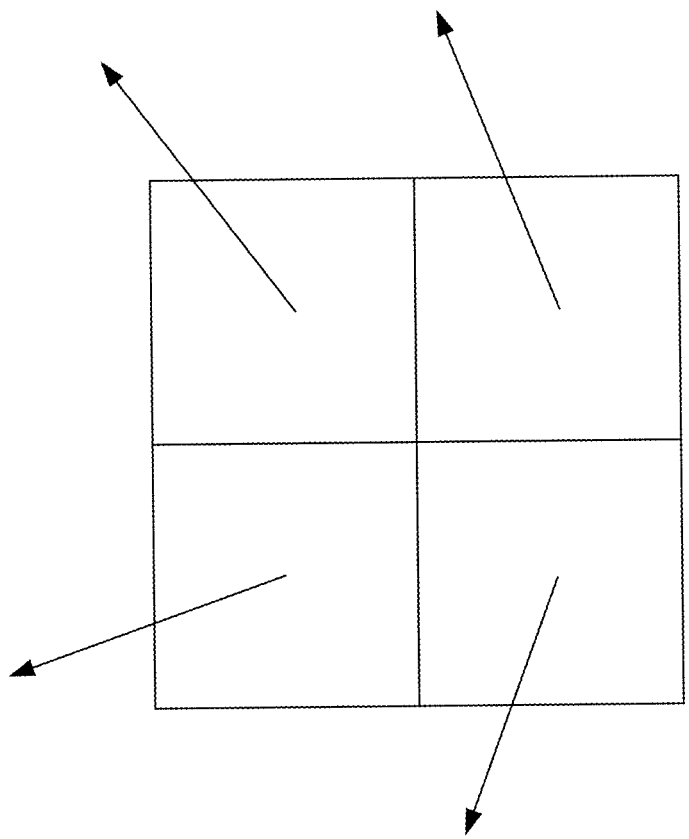
FIGS. 7A and 7B are conceptual diagrams illustrating a block predicted using a single motion vector and a block divided into sub-blocks, each predicted with respective motion vectors.
Figure 7A:
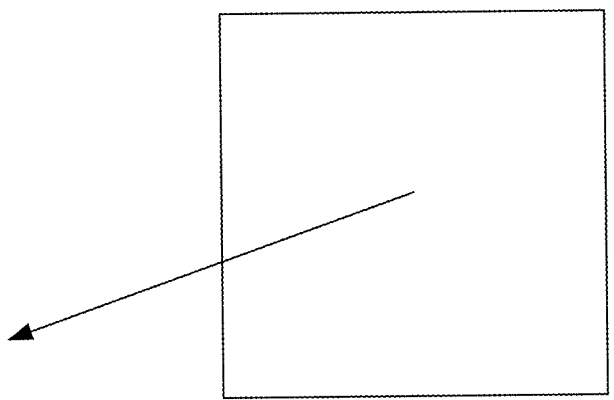

FIGS. 7A and 7B are conceptual diagrams illustrating a block predicted using a single motion vector and a block divided into sub-blocks, each predicted with respective motion vectors. In JEM, affine motion compensation introduces sub-block motion compensation. Unlike the traditional single block motion compensation where the whole block has only one motion vector for a reference list as shown in FIG. 7A, the sub-block motion compensation allows a block to be divided into more than one sub-blocks with different motion vectors for a reference list as shown in FIG. 7B.

FIG. 8 is a conceptual diagram illustrating an example of required samples in the reference picture in the interpolation procedure. The sub-block motion compensation may increase the bandwidth burden due to the interpolation procedure. The required samples in the reference picture may be more than the samples in the block because of interpolation.

Figure 9:
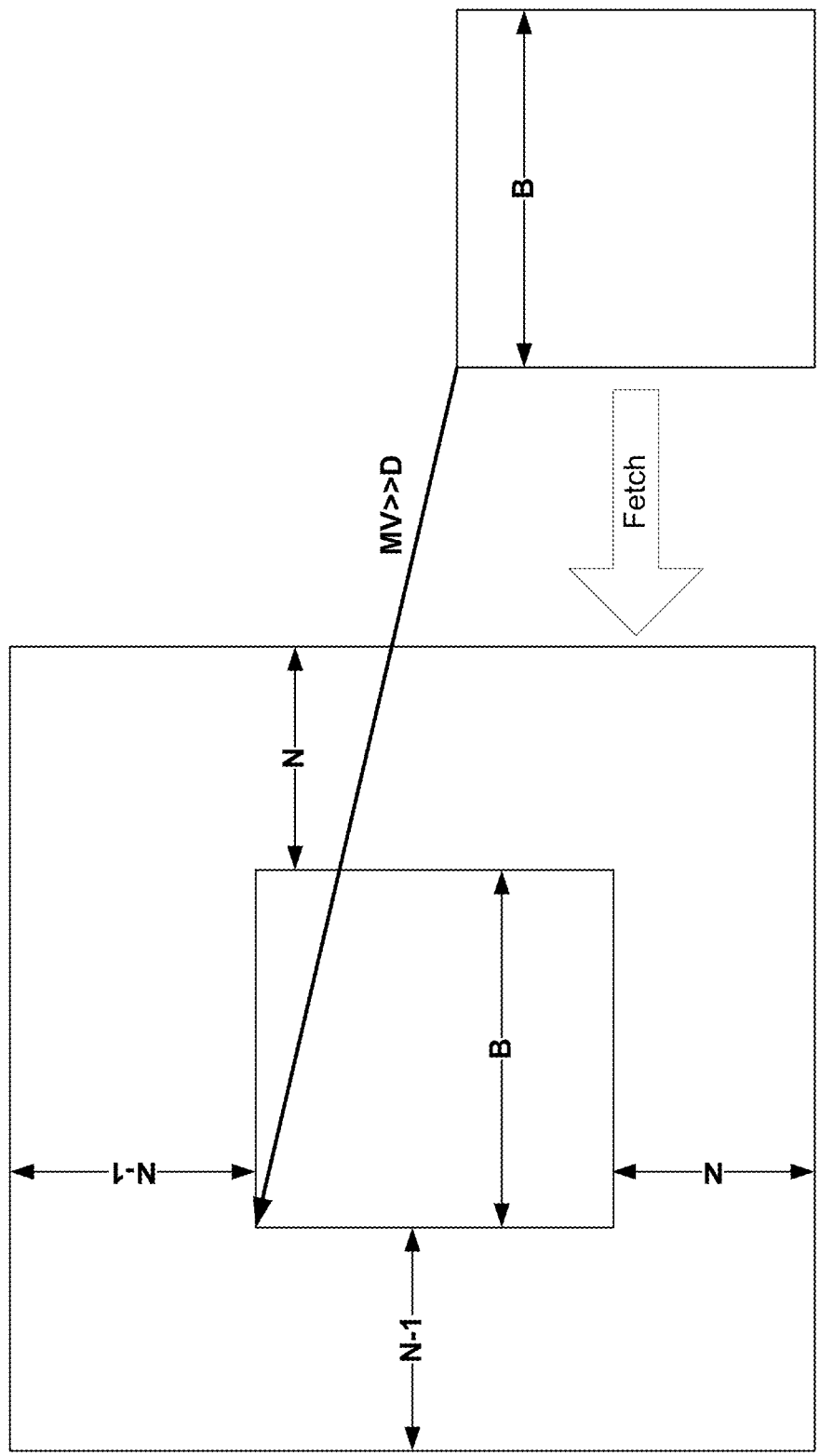
FIG. 9 is a conceptual diagram illustrating an example of fetching samples in the reference picture for a block with size B×B.

FIG. 9 is a conceptual diagram illustrating an example of fetching samples in the reference picture for a block with size B×B. A region larger than B×B in the reference picture may be required to fetch. First a reference block with size B×B is located by the integer part of the motion vector (MV), which can be calculated as MV>>D, where D is the precision of the MV. Suppose the interpolation filter is a 2N-tap filter, then the fetching region size is S1=(B+2N−1)×(B+2N−1). This fetching area determines the required bandwidth for the motion compensation of the B×B block.

Figure 10:
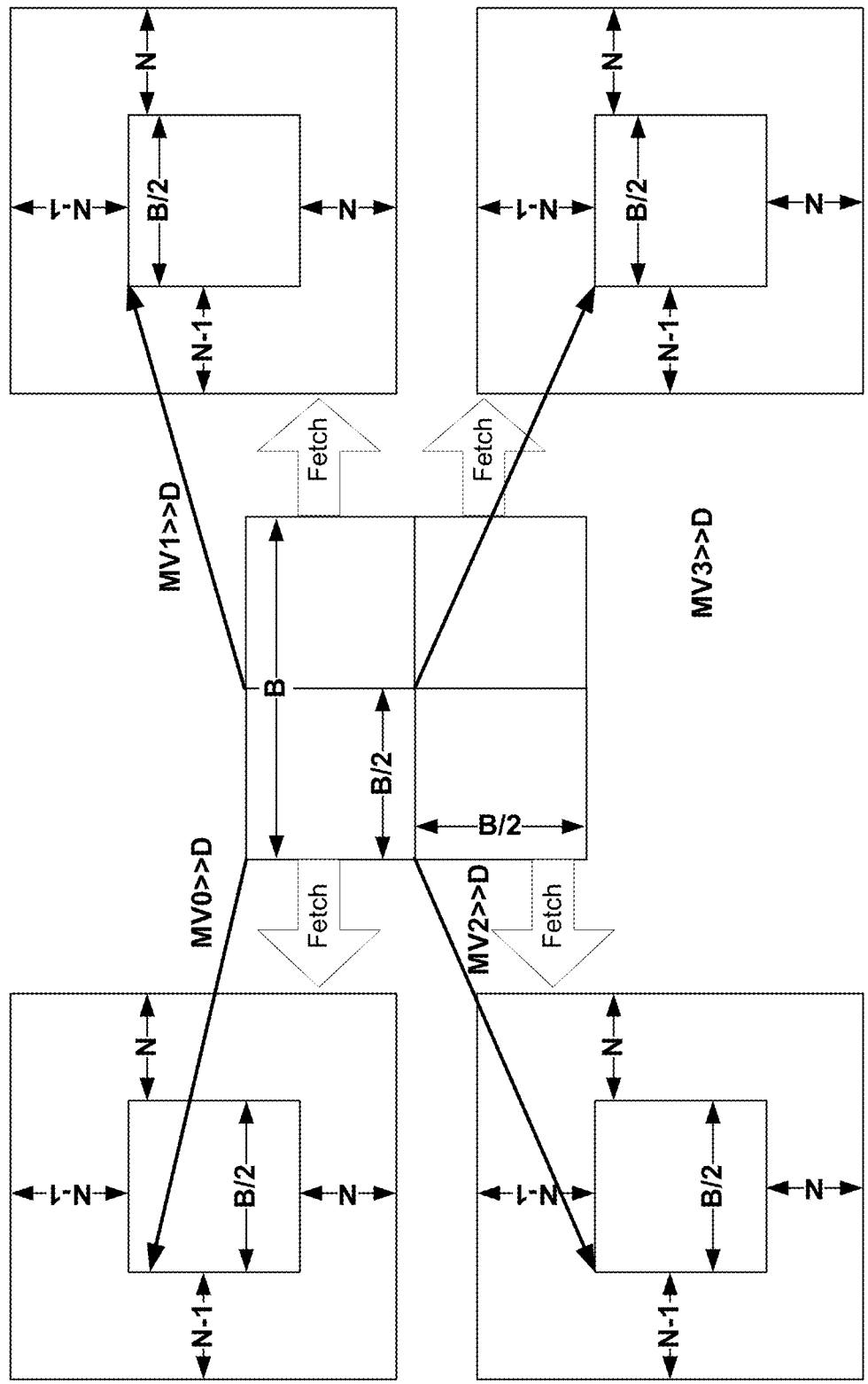
FIG. 10 is a conceptual diagram illustrating an example of fetching samples in the reference picture for a block with size B×B using sub-block motion compensation.
Figure 11:
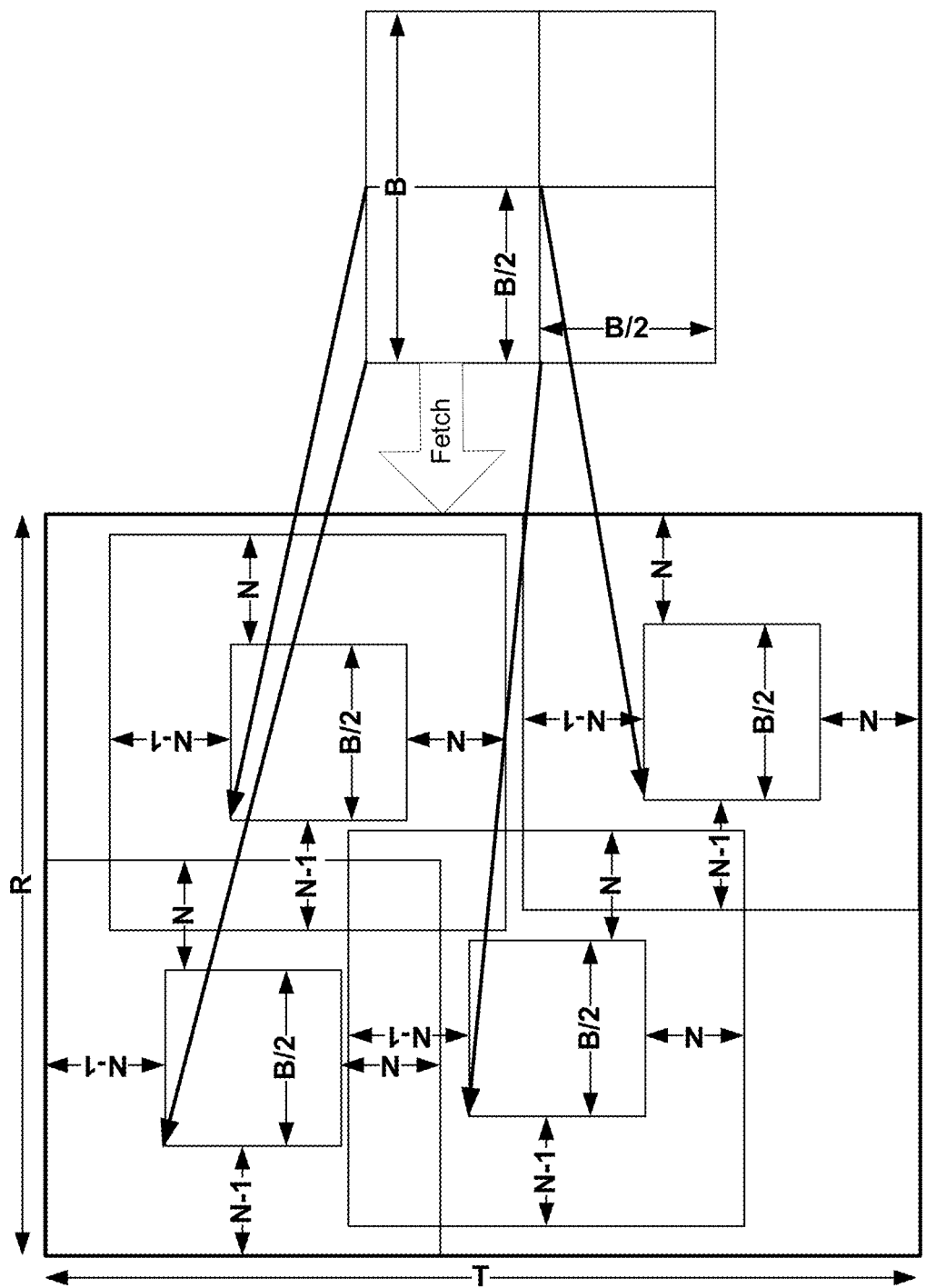
FIG. 11 is a conceptual diagram illustrating how samples for a block with size B/2×B/2 can be retrieved from a reference block.

FIG. 10 is a conceptual diagram illustrating an example of fetching samples in the reference picture for a block with size B×B using sub-block motion compensation. FIG. 11 is a conceptual diagram illustrating how samples for a block with size B/2×B/2 can be retrieved from a reference block. Suppose the block of FIG. 10 with size B×B is divided into M (M=P×P) sub-blocks (e.g., in FIG. 11, P=2) with size (B/P)×(B/P). The size of samples required to fetch in the reference picture for each sub-block is (B/P+2N−1)×(B/P+2N−1). Since there are M sub-blocks, the total required fetching size is S2=(B/P+2N−1)×(B/P+2N−1)×M=(B+(2N−1)×P)×(B+(2N−1)×P), which is larger than S1. For example, if B=8, N=4 and P=2, then S1=225 and S2=484. S2=2.15× S1, meaning that the required bandwidth may be more than doubled by the sub-block motion compensation.

Video coding devices, such as video encoder 20 and video decoder 30, may employ the techniques of this disclosure to limit the required bandwidth in affine motion compensation by reducing the size of samples to be fetched from a reference picture. Video encoder 20 and video decoder 30 may apply the following techniques individually or in any combination.

For a reference picture list, if the current block with size A×B is divided into several sub-blocks (sub-block width equal to K and height equal to L, in one example, K is equal to L) applies affine motion compensation, video encoder 20 or video decoder 30 may fetch a selected single block with size R×T from the reference picture instead of fetching the required reference samples individually for each sub-block. All the required reference samples for each sub-block may be found inside the selected single fetching block. FIG. 11 illustrates an example of the proposed fetching approach, where the current block size is B×B divided by four B/2×B/2 sub-blocks.

In one example, video encoder 20 or video decoder 30 may determine the selected single block to have the minimum size in all single blocks that can cover all the required reference samples for each sub-block. That is, video encoder 20 or video decoder 30 may determine a single reference block having a smallest size possible while also including each reference block referred to by sub-blocks of a current block being coded.

In one example, video encoder 20 or video decoder 30 may be configured on the basis that the involved motion vectors of all sub-blocks in the current block applying affine motion compensation must refer to the same reference picture. In one example, furthermore, if multiple reference pictures are assigned to sub-blocks within the current block, video encoder 20 or video decoder 30 may first scale the associated motion vectors to the same reference picture.

In an example, the coordinate of the right-bottom of the picture is $(x^{max}, y^{max})$; video encoder 20 or video decoder 30 may divide the current block into M sub-blocks; the coordinate of the left-top corner of the selected single block is $(x^0, y^0)$; the coordinate of the right-bottom corner of the selected single block is $(z^0, w^0)$; the coordinate of the left-top corner of the ith sub-block is $(x_i, y_i)$; the coordinate of the right-bottom corner of the ith sub-block is $(z_i, w_i)$; the integer part of the coordinate of the left-top corner of the reference block of the ith sub-block is $(x'_i, y'_i)$; the integer part of the coordinate of the right-bottom corner of the reference block of ith sub-block is $(z'_i, w'_i)$; the motion vector of the ith sub-block is $MV=(mv^x_i, mv^y_i)$; D is the precision of MV; the interpolation filter is a 2N-tap filter. Thus, video encoder 20 or video decoder 30 may determine a single reference block by determining an upper edge of the single reference block to be equal to a highest upper vertex of the reference blocks for the four corner sub-blocks, determining a lower edge of the single reference block to be equal to a lowest lower vertex of the reference blocks for the four corner sub-blocks, determining a left edge of the single reference block to be equal to a leftmost vertex of the reference blocks for the four corner sub-blocks, and determining a right edge of the single reference block to be equal to a rightmost vertex of the reference blocks for the four corner sub-blocks.

According to the above example, in one example, $x'_i=x_i+((mv^x_i+offsetX)>>D)$; $y'_i=y_i+((mv^y_i+offsetY)>>D)$; $z'_i=z_i+((mv^z_i+offsetZ)>>D)$; $w'_i=w_i+((mv^w_i+offsetW)>>D)$. In one example, the four offset variables (offsetX, offsetY, offsetZ and offsetW) are set to 0. In another example the four offset variables are set to $(1<<(D-1))$.

According to the above example, in another example, $x^0=max\{0, min\{x'_i-N+1, \text{for all i between 0 and } M-1\}\}$; $y^0=max\{0, min\{y'_i-N+1, \text{for all i between 0 and } M-1\}\}$;

$z^0=\min\{x^{max}, \max\{z'_i+N,$ for all i between 0 and M−1}};
$w^0=\min\{y^{max}, \max\{w'_i+N,$ for all i between 0 and M−1} }.

Figure 12:
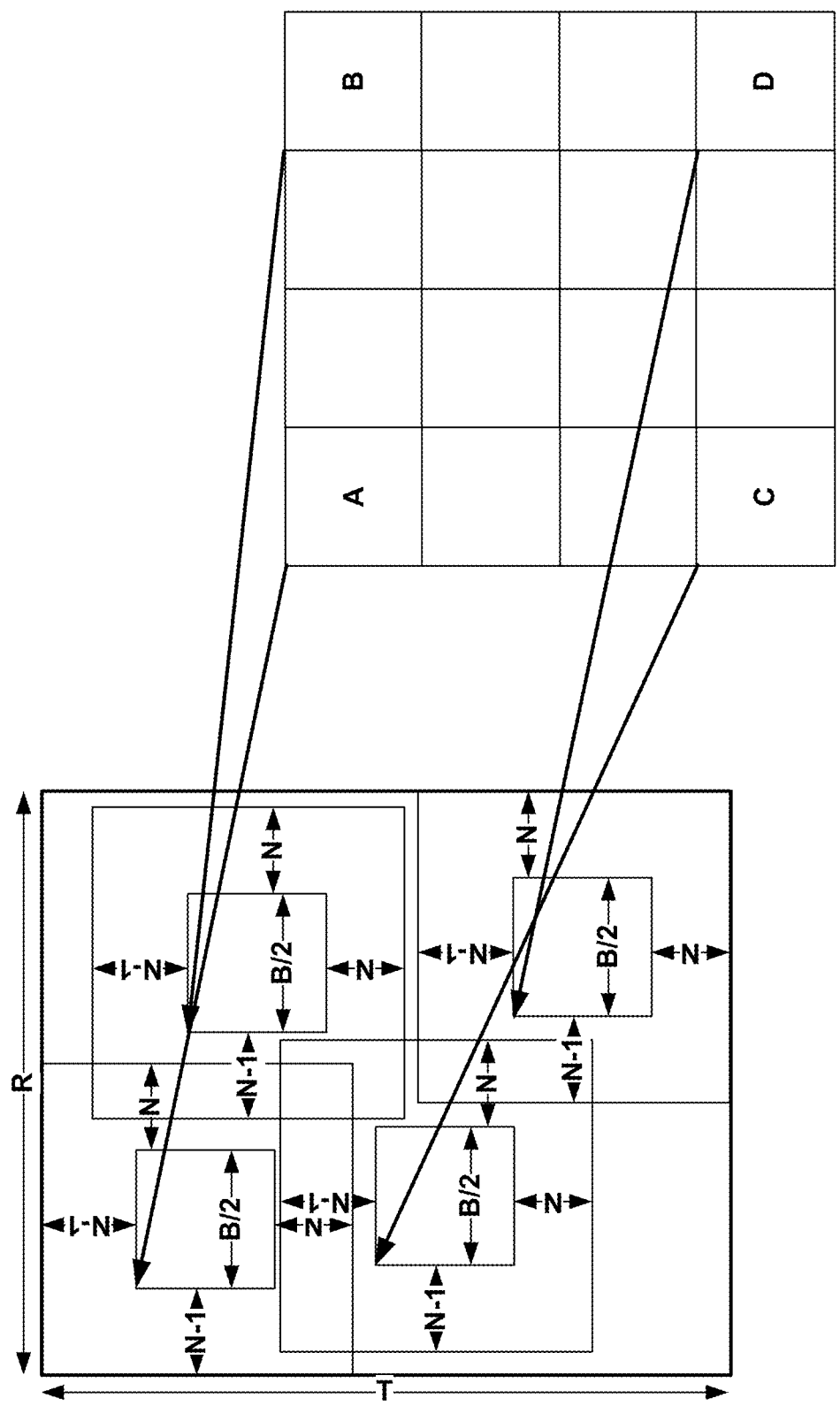
FIG. 12 is a conceptual diagram illustrating four corner sub-blocks A, B, C and D of a current block to be predicted for coding.

FIG. 12 is a conceptual diagram illustrating four corner sub-blocks A, B, C and D of a current block to be predicted for coding. According to the above example, in a further example, the proposed selected single block with size R×T can be determined by motion vectors of the four corner sub-blocks of the current block applying affine motion compensation. The integer part of the coordinates of the left-top corners of the reference blocks of the sub-block A, B, C and D are $(x'_0, y'_0)$, $(x'_1, y'_1)$, $(x'_2, y'_2)$ and $(x'_3, y'_3)$, respectively. The integer part of the coordinates of the right-bottom corners of the reference blocks of sub-block A, B, C and D are $(z'_0, w'_0)$, $(z'_1, w'_1)$, $(z'_2, w'_2)$ and $(z'_3, w'_3)$, respectively; then $x^0=\max\{0, \min\{x'_i-N+1,$ for all i=0, 1, 2 and 3}}; $y^0=\max\{0, \min\{y'_i-N+1,$ for all i=0, 1, 2 and 3}}; $z^0=\min\{x^{max}, \max\{z'_i+N,$ for all i=0, 1, 2 and 3}}; $w^0=\min\{y^{max}, \max\{w'_i+N,$ for all i=0, 1, 2 and 3}}.

Figure 13:
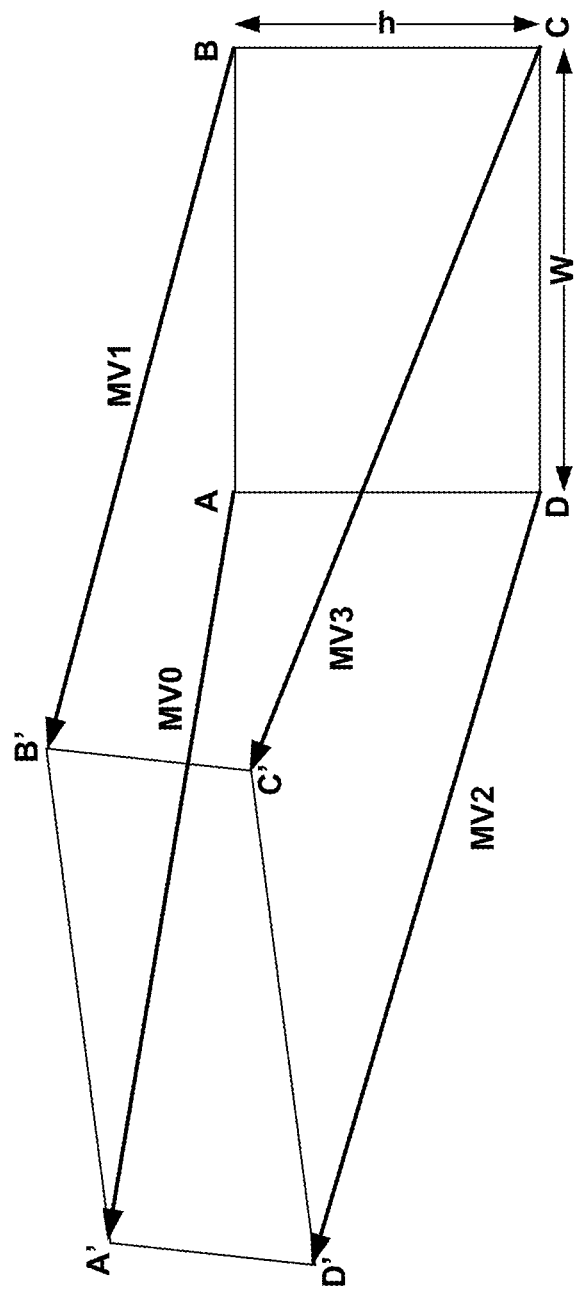
FIG. 13 is a conceptual diagram illustrating four corner MVs (MV0, MV1, MV2 and MV3) for a w×h block with affine motion compensation.

FIG. 13 is a conceptual diagram illustrating four corner MVs (MV0, MV1, MV2 and MV3) for a w×h block with affine motion compensation. In one example, video encoder 20 or video decoder 30 may determine the proposed selected single block with size R×T using the four corner motion vectors of the current block applying affine motion compensation. MV0, MV1, MV2 and MV3 may be derived with coordinates $(x_0, y_0)=(0, 0)$, $(x_1, y_1)=(w, 0)$, $(x_2, y_2)=(0, h)$ and $(x_3, y_3)=(w, h)$ by equation (2) for the 4-parameter affine model, or by equation (4) for the 6-parameter affine model. The four corners of the current block are denoted as A, B, C and D with MV0, MV1, MV3 and MV2, respectively, in FIG. 13. The motion compensation positions in the reference picture for A, B, C and D are A', B', C' and D', respectively, as shown in FIG. 13. The integer part of coordinates of A', B', C' and D' are $(x'_0, y'_0)$, $(x'_1, y'_1)$, $(x'_3, y'_3)$ and $(x'_2, y'_2)$, respectively, which can be at sub-sample positions.

In one example, video encoder 20 or video decoder 30 may determine the selected single block to have the minimum size in all single blocks that can cover all the reference samples required to interpolate all the sub-samples inside the quadrilateral A'B'C'D'.

Figure 14:
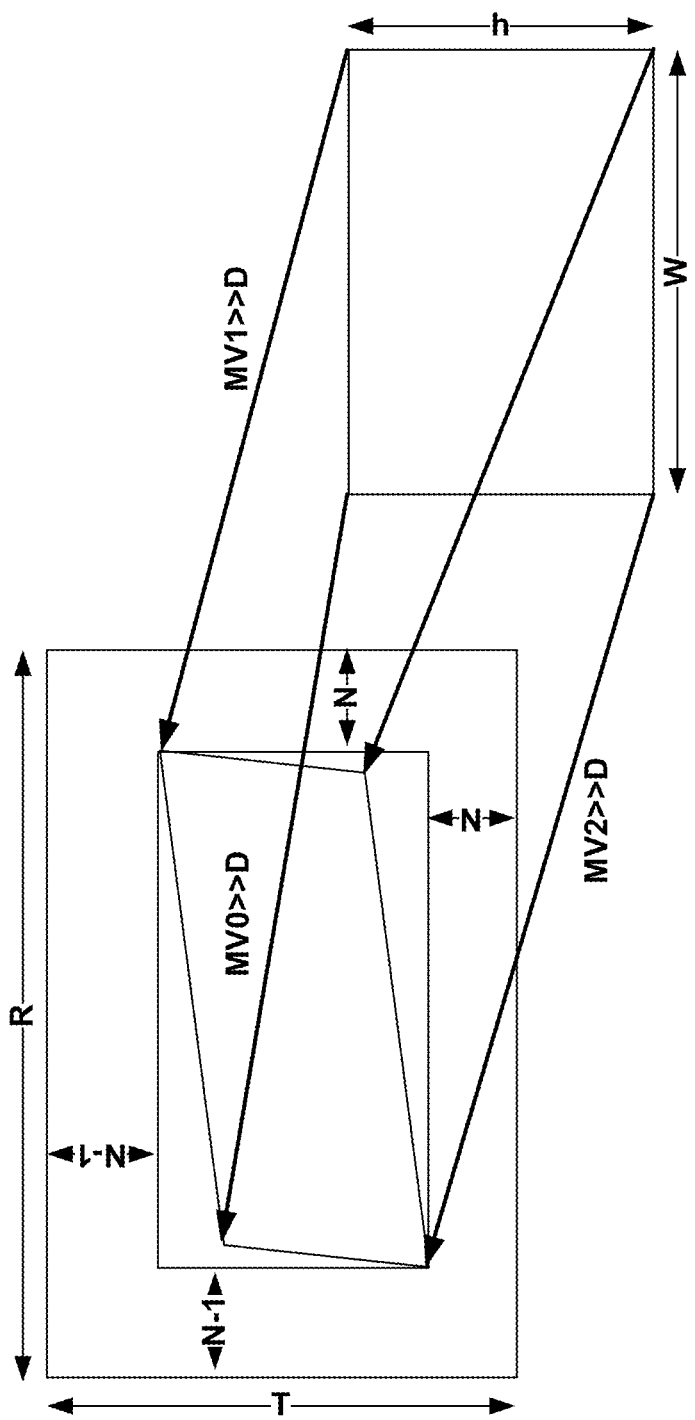
FIG. 14 is a conceptual diagram illustrating an example of finding the selected block from four corner MVs.

In an example, the coordinate of the right-bottom of the picture is $(x^{max}, y^{max})$; the coordinate of the left-top corner of the selected single block is $(x^0, y^0)$; the coordinate of the right-bottom corner of the selected single block is $(z^0, w^0)$; then, a. $x^{00}=\min \{x'_0, x'_1, x'_2, x'_3\}$; $y^{00}=\min \{y'_0, y'_1, y'_2, y'_3\}$;
  $z^{00}=\max \{x'_0, x'_1, x'_2, x'_3\}$; $w^{00}=\max \{y'_0, y'_1, y'_2, y'_3\}$;
b. $x^0=\max \{0, x^{00}-N+1\}$; $y^0==\max \{0, y^{00}-N+1\}$;
  $z^0=\min \{x^{max}, z^{00}+N\}$; $w^0=\min \{y^{max}, w^{00}-N+1\}$;

FIG. 14 is a conceptual diagram illustrating an example of finding the selected block from four corner MVs. In one example, the described techniques may be applied to all components such as Y, Cb, and Cr of the YCbCr color space. In another example, the proposed method can be applied to only one or some components. For example, the described techniques may be applied only to one component, for example Y (or Cb, or Cr). In one example, it is adaptively decided whether to fetch the reference samples once for all sub-blocks or fetch each the reference samples for sub-block independently. For example, the proposed techniques may be only applied if R×T is less than the total size of the reference samples fetched for sub-block independently. In another example, the described techniques may be only applied to certain coding modes, such as SKIP or merge or AMVP mode. In a further example, information about whether to apply the described block fetching approach for affine motion compensation may be signaled from the encoder to the decoder. The signaling can be at the sequence level such as in sequence parameter set (SPS), at picture level such as in picture parameter set (PPS), at the slice level, such as in the slice header, at the coding tree unit (CTU) level, or at the coding unit (CU) level.

In an example, the sub-block's width K and height L may be any integer larger than 0. If K=L=1, a sub-block may degenerate into one single sample.

In one example, the allowed maximum size of the selected block is defined. In a further example, the allowed maximum size of the selected block may be predefined. In another example, the allowed maximum size of the selected block may be dependent on the current block size/sub-block size/coding mode/maximum size of a coding block. In another example, the allowed maximum size of the selected block can be signaled from the encoder to the decoder whether to apply the proposed block fetching approach for affine motion compensation. The signaling may be at sequences level such as in the sequence parameter set (SPS), at the picture level such as in the picture parameter set (PPS), at the slice level, such as in the slice header, at the coding tree unit (CTU) level, or at the coding unit (CU) level. The size of the selected block may be calculated as $(z^0-x^0) \times (w^0-y^0)$.

There may be some restrictions employed the affine motion compensation. Any combination of these restrictions may be applied. Whether to apply these restrictions and the parameters of these restrictions may be predefined, or can be signaled from the encoder to the decoder. The signaling may be at the sequence level such as in the sequence parameter set (SPS), at the picture level such as in the picture parameter set (PPS), at the slice level, such as in the slice header, at the coding tree unit (CTU) level, or at the coding unit (CU) level. Restrictions may include: (1) Affine motion compensation can only be used as uni-prediction, i.e., bi-prediction is forbidden in affine motion compensation. (2) The size of sub-block can depend on whether uni-prediction or bi-prediction is applied. For example, the sub-block size is 4×4 for uni-prediction but 8×8 for bi-prediction. (3) If the sub-block size is K×L, the size of the smallest block that apply affine motion compensation is 2K×2L. (4) The value of $|MV0_x-MV1_x|$ is not allowed to be larger than a maximum value. MV0 and MV1 are shown in FIG. 14. (5) The value of $|MV0_y-MV1_y|$ is not allowed to be larger than a maximum value. MV0 and MV1 are shown in FIG. 14. (6) The value of $|MV0_x-MV2_x|$ is not allowed to be larger than a maximum value. MV0 and MV2 are shown in FIG. 14. (7) The value of $|MV0_y-MV2_y|$ is not allowed to be larger than a maximum value. MV0 and MV2 are shown in FIG. 14. (8) The value of $|MV1_x-MV2_x|$ is not allowed to be larger than a maximum value. MV1 and MV2 are shown in FIG. 14. (9) The value of $|MV1_y-MV2_y|$ is not allowed to be larger than a maximum value. MV1 and MV2 are shown in FIG. 14.

Figure 15:
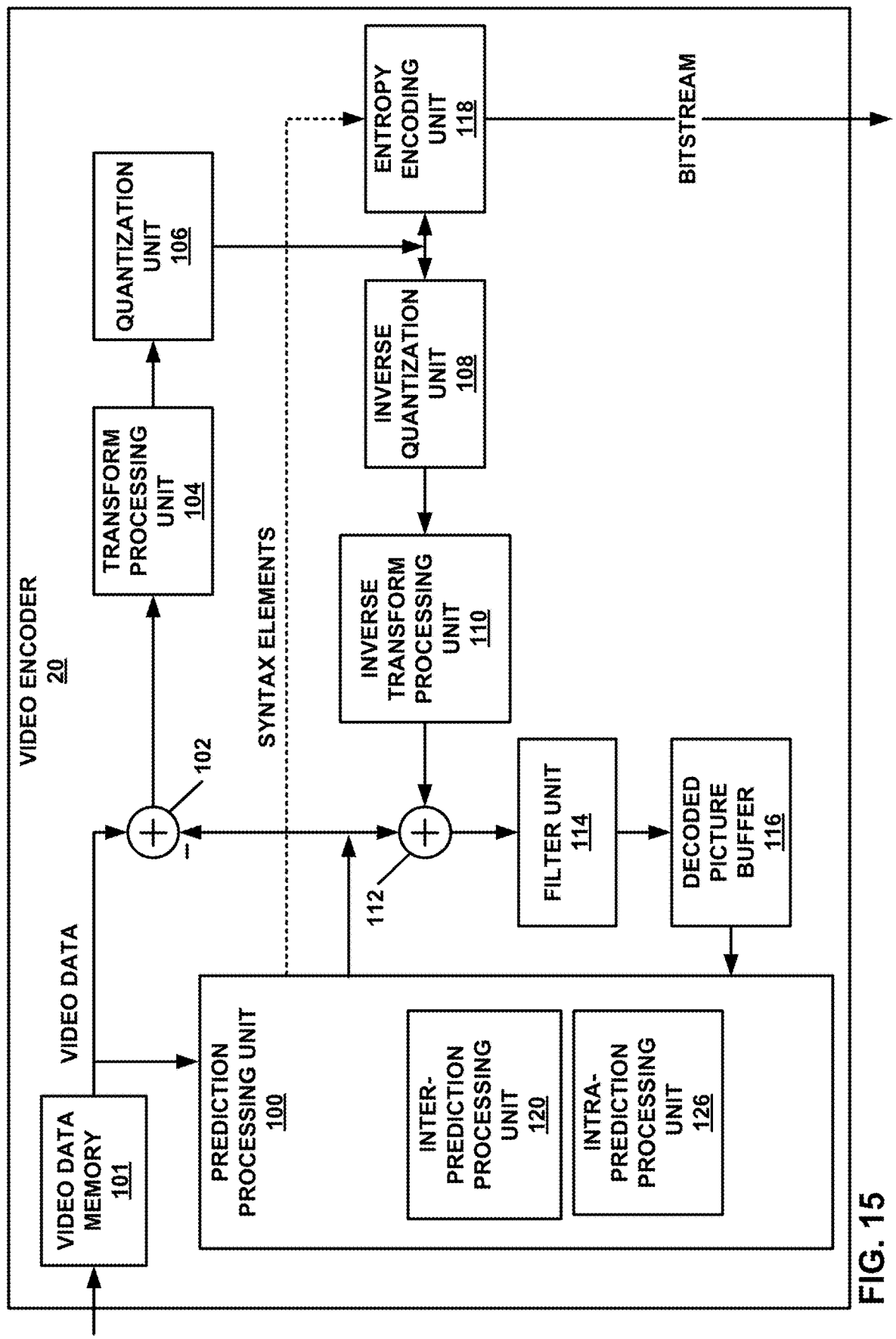
FIG. 15 is a block diagram illustrating an example video encoder that may implement one or more techniques described in this disclosure.

FIG. 15 is a block diagram illustrating an example video encoder 20 that may implement the techniques of this disclosure. FIG. 15 is provided for purposes of explanation and should not be considered limiting of the techniques as broadly exemplified and described in this disclosure. The techniques of this disclosure may be applicable to various coding standards or methods.

In the example of FIG. 15, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

The various units illustrated in FIG. 15 are examples of fixed-function circuits, programmable circuits, or a combination thereof. For example, the various units illustrated in FIG. 15 may include arithmetic logic units (ALUs), elementary function units (EFUs), logic gates, and other circuitry that can be configured for fixed function operation, configured for programmable operation, or a combination.

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be in or connected to video encoder 20.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Inter-prediction processing unit 120 may apply the techniques for affine motion vectors as described elsewhere in this disclosure. For example, inter-prediction processing unit 120 may perform the example operations described above for the motion vector generation such as based on sets of motion vectors having motion vectors that refer to the same reference picture, but, in some examples, are not equal to each other. Although inter-prediction processing unit 120 is described as performing the example operations, in some examples, one or more other units in addition to or instead of inter-prediction processing unit 120 may perform the example methods, and the techniques are not limited to inter-prediction processing unit 120 performing the example operations.

In particular, according to certain techniques of this disclosure, inter-prediction processing unit 120 may determine that a current block is to be predicted using affine prediction. Moreover, inter-prediction processing unit 120 may determine that the current block is to be divided into a plurality of sub-blocks, each having their own affine motion information referring to reference blocks of one or more reference pictures of decoded picture buffer 116. In accordance with the techniques of this disclosure, rather than retrieving each of the reference blocks individually, which may consume excess bandwidth and require a number of retrievals, inter-prediction processing unit 120 may determine a single reference block of a reference picture including each of the reference blocks for the sub-blocks of the current picture.

More particularly, inter-prediction processing unit 120 may identify the four corner sub-blocks of the current block (e.g., as shown in FIG. 12 as blocks A, B, C, and D), and determine reference blocks for each of these sub-blocks in a reference picture (e.g., as also shown in FIG. 12). Inter-prediction processing unit 120 may then determine a single reference block including the reference blocks for the corner sub-blocks using motion information of the reference blocks, such that corners of the single reference block correspond to corners of the respective reference blocks of the four corner sub-blocks. Inter-prediction processing unit 120 may then retrieve the single reference block from decoded picture buffer 116 and predict the sub-blocks of the current blocks using data of the retrieved single reference block.

In some examples, inter-prediction processing unit 120 may determine the single reference block to have a smallest size possible while also including each of the respective reference blocks. For example, as shown in FIG. 14, the single reference block may include each of the reference blocks identified by affine motion information for four corner sub-blocks of a current block. In some examples, inter-prediction processing unit 120 may determine an upper edge of the single reference block to be equal to a highest upper vertex of the reference blocks for the four corner sub-blocks, determine a lower edge of the single reference block to be equal to a lowest lower vertex of the reference blocks for the four corner sub-blocks, determine a left edge of the single reference block to be equal to a leftmost vertex of the reference blocks for the four corner sub-blocks, and determine a right edge of the single reference block to be equal to a rightmost vertex of the reference blocks for the four corner sub-blocks.

Alternatively, in some examples, inter-prediction processing unit 120 may determine the single reference block to include additional samples of the reference picture beyond vertices of at least one of the reference blocks (e.g., each of the reference blocks) for the four corner sub-blocks. For example, as shown in FIG. 14, the single reference block may have edges that are N or N−1 samples away from the smallest possible reference block.

In some examples, inter-prediction processing unit 120 may prevent the single reference block from exceeding an allowable maximum size. The allowable maximum size may be predetermined. In some examples, video encoder 20 may signal the allowable maximum size in a parameter set, such as a picture parameter set (PPS), sequence parameter set (SPS), or a video parameter set (VPS). Alternatively, video encoder 20 may signal the allowable maximum size in a slice header. In some examples, video encoder 20 may be configured to determine the allowable maximum size based on characteristics of the current block, such as a size of the current block.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

In this manner, video encoder 20 represents an example of a device for coding video data including a memory (e.g., video data memory 101 and decoded picture buffer 116) configured to store video data; and a processing unit (e.g., including any or all of prediction processing unit 100, inter-prediction processing unit 120, residual generation unit 102, transform processing unit 104, quantization unit 106, entropy encoding unit 118, inverse quantization unit 108, inverse transform processing unit 110, reconstruction unit 112, and filter unit 114) implemented in circuitry and configured to: determine that a block of the video data includes a plurality of sub-blocks, each of the sub-blocks having respective motion information referring to respective reference blocks in a reference picture stored in the memory; determine a single reference block of the reference picture, the single reference block including each of the respective reference blocks, wherein determining the single reference block comprises: determine four corner sub-blocks of the block included in the plurality of sub-blocks; and determine the single reference block according to the respective motion information for the four corner sub-blocks such that corners of the single reference block correspond to corners of the respective reference blocks of the four corner sub-blocks; retrieve data of the single reference block from the reference picture in the memory; and predict the sub-blocks from the respective reference blocks using the data of the single reference block.

Figure 16:
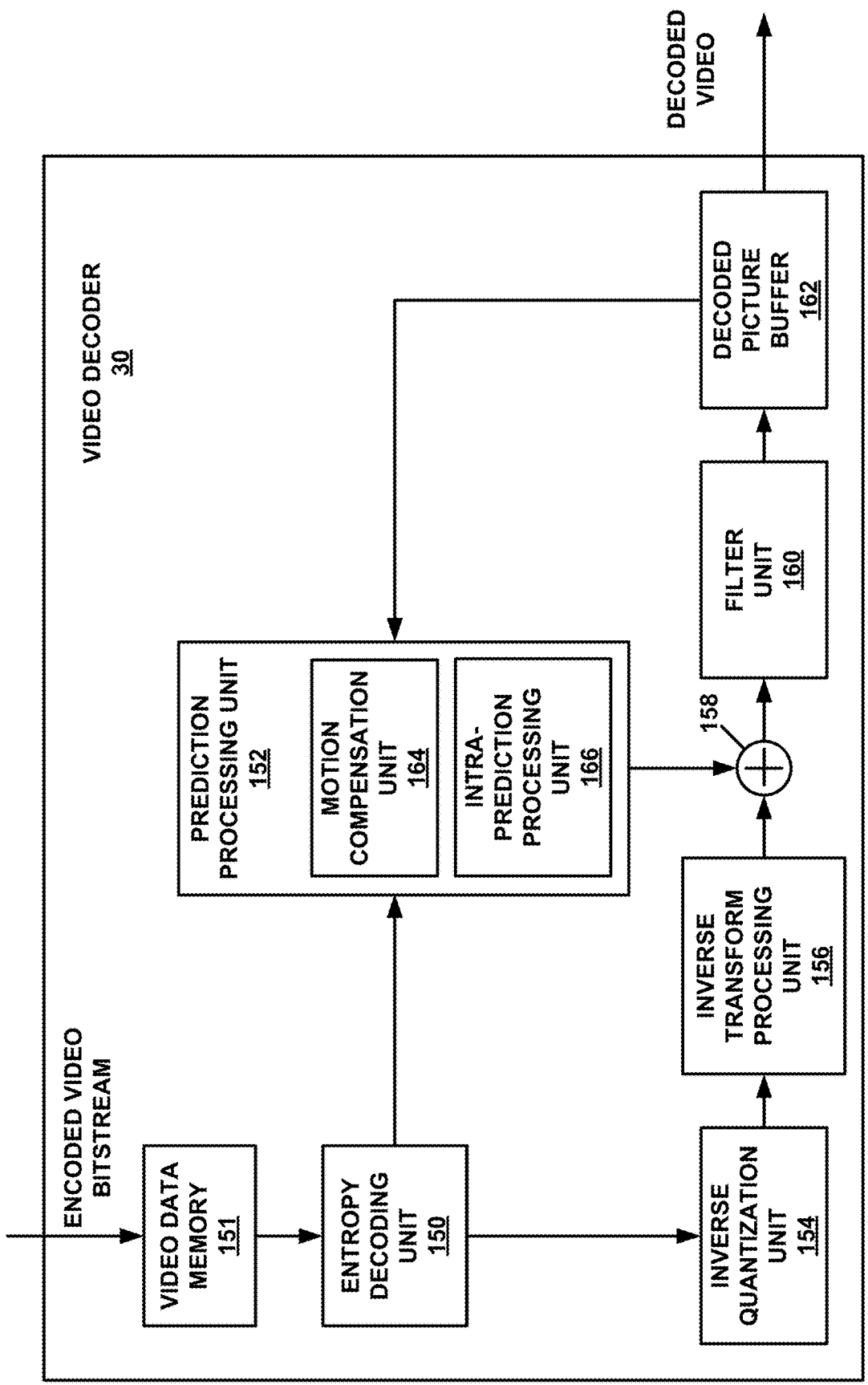
FIG. 16 is a block diagram illustrating an example video decoder that may implement one or more techniques described in this disclosure.

FIG. 16 is a block diagram illustrating an example video decoder 30 that is configured to implement the techniques of this disclosure. FIG. 16 is provided for purposes of explanation and is not limiting on the techniques as broadly exemplified and described in this disclosure. For purposes of explanation, this disclosure describes video decoder 30 in the context of HEVC coding as an example. However, the techniques of this disclosure may be applicable to other coding standards or methods.

In the example of FIG. 16, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

The various units illustrated in FIG. 16 are examples of fixed-function circuits, programmable circuits, or a combination. For example, the various units illustrated in FIG. 10 may include arithmetic logic units (ALUs), elementary function units (EFUs), logic gates, and other circuitry that can be configured for fixed function operation, configured for programmable operation, or a combination.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. The video data may be encoded video data such as that encoded by video encoder 20. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode (e.g., using CABAC) entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 (also called inter-prediction processing unit 164) may determine, based on the motion information of the PU, one or more reference blocks. Motion compensation unit 164 may generate, based on the one or more reference blocks, predictive blocks (e.g., predictive luma, Cb and Cr blocks) for the PU.

Motion compensation unit 164 may apply the techniques for affine motion models as described elsewhere in this disclosure. For example, motion compensation unit 164 may perform the example operations described above for the motion vector generation such as based on sets of motion vectors having motion vectors that refer to the same reference picture, but, in some examples, are not equal to each other. Although motion compensation unit 164 is described as performing the example operations, in some examples, one or more other units in addition to or instead of motion compensation unit 164 may perform the example methods, and the techniques are not limited to motion compensation unit 164 performing the example operations.

In particular, according to certain techniques of this disclosure, motion compensation unit 164 may determine that a current block is to be predicted using affine prediction. Moreover, motion compensation unit 164 may determine that the current block is to be divided into a plurality of sub-blocks, each having their own affine motion information referring to reference blocks of one or more reference pictures of decoded picture buffer 162. For example, entropy decoding unit 150 may provide data for syntax elements of the current block to motion compensation unit 164 indicating that the current block is to be predicted by dividing the current block into sub-blocks and predicting each of the sub-blocks using affine motion prediction. In accordance with the techniques of this disclosure, rather than retrieving each of the reference blocks individually, which may consume excess bandwidth and require a number of retrievals, motion compensation unit 164 may determine a single reference block of a reference picture including each of the reference blocks for the sub-blocks of the current picture.

More particularly, motion compensation unit 164 may identify the four corner sub-blocks of the current block (e.g., as shown in FIG. 12 as blocks A, B, C, and D), and determine reference blocks for each of these sub-blocks in a reference picture (e.g., as also shown in FIG. 12). Motion compensation unit 164 may then determine a single reference block including the reference blocks for the corner sub-blocks using motion information of the reference blocks, such that corners of the single reference block correspond to corners of the respective reference blocks of the four corner sub-blocks. Motion compensation unit 164 may then retrieve the single reference block from decoded picture buffer 162 and predict the sub-blocks of the current blocks using data of the retrieved single reference block.

In some examples, motion compensation unit 164 may determine the single reference block to have a smallest size possible while also including each of the respective reference blocks. For example, as shown in FIG. 14, the single reference block may include each of the reference blocks identified by affine motion information for four corner sub-blocks of a current block. In some examples, motion compensation unit 164 may determine an upper edge of the single reference block to be equal to a highest upper vertex of the reference blocks for the four corner sub-blocks, determine a lower edge of the single reference block to be equal to a lowest lower vertex of the reference blocks for the four corner sub-blocks, determine a left edge of the single reference block to be equal to a leftmost vertex of the reference blocks for the four corner sub-blocks, and determine a right edge of the single reference block to be equal to a rightmost vertex of the reference blocks for the four corner sub-blocks.

Alternatively, in some examples, motion compensation unit 164 may determine the single reference block to include additional samples of the reference picture beyond vertices of at least one of the reference blocks (e.g., each of the reference blocks) for the four corner sub-blocks. For example, as shown in FIG. 14, the single reference block may have edges that are N or N−1 samples away from the smallest possible reference block.

In some examples, motion compensation unit 164 may prevent the single reference block from exceeding an allowable maximum size. The allowable maximum size may be predetermined. In some examples, video decoder 30 may receive signaled data defining the allowable maximum size in a parameter set, such as a picture parameter set (PPS), sequence parameter set (SPS), or a video parameter set (VPS). Alternatively, video decoder 20 may receive data signaling the allowable maximum size in a slice header. In some examples, video decoder 30 may be configured to determine the allowable maximum size based on characteristics of the current block, such as a size of the current block.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

In this manner, video decoder 30 represents an example of a device for coding video data including a memory (e.g., video data memory 151 and decoded picture buffer 162) configured to store video data; and a processing unit (e.g., including any or all of prediction processing unit 152, motion compensation unit 164, entropy decoding unit 150, inverse quantization unit 154, inverse transform processing unit 156, reconstruction unit 158, and filter unit 160) implemented in circuitry and configured to: determine that a block of the video data includes a plurality of sub-blocks, each of the sub-blocks having respective motion information referring to respective reference blocks in a reference picture stored in the memory; determine a single reference block of the reference picture, the single reference block including each of the respective reference blocks, wherein determining the single reference block comprises: determine four corner sub-blocks of the block included in the plurality of sub-blocks; and determine the single reference block according to the respective motion information for the four corner sub-blocks such that corners of the single reference block correspond to corners of the respective reference blocks of the four corner sub-blocks; retrieve data of the single reference block from the reference picture in the memory; and predict the sub-blocks from the respective reference blocks using the data of the single reference block.

Figure 17:
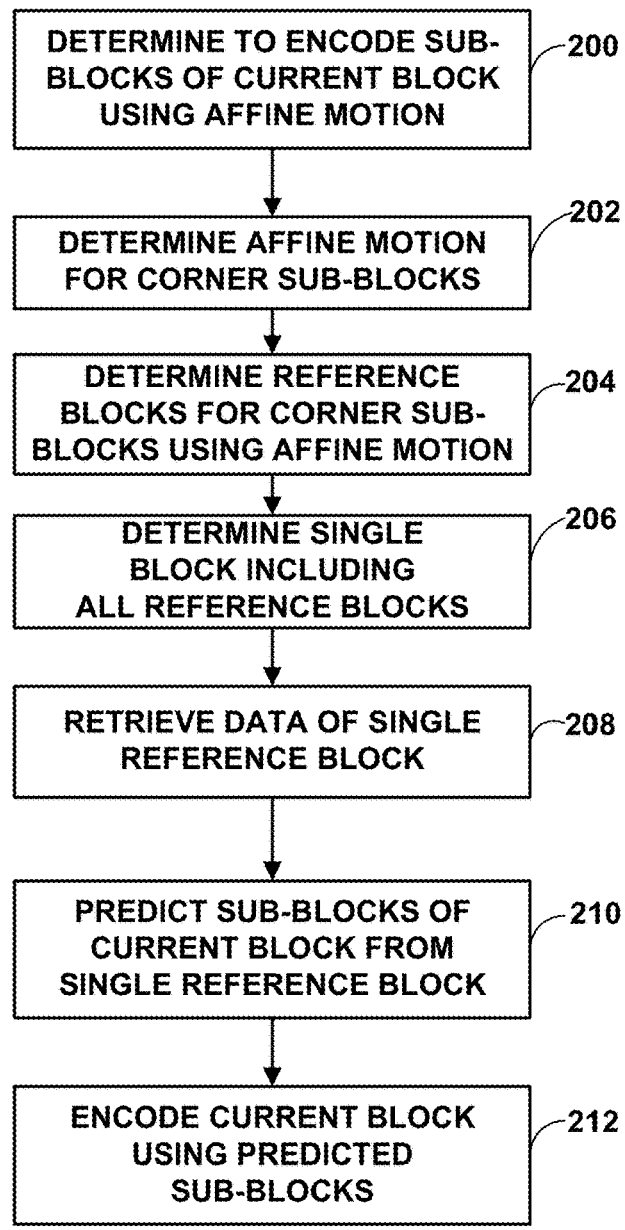
FIG. 17 is a flowchart illustrating an example method for encoding video data in accordance with the techniques of this disclosure.

FIG. 17 is a flowchart illustrating an example method for encoding video data in accordance with the techniques of this disclosure. Although explained with respect to video encoder 20 of FIGS. 1 and 15, it should be understood that other devices may be configured to perform this or a similar method.

Initially, video encoder 20 may determine to encode sub-blocks of a current block using affine motion prediction (200). For example, prediction processing unit 100 may test a variety of different block sizes and coding modes and perform rate-distortion (RD) analysis to determine an appropriate size for the current block and prediction mode for the current block. In this example, prediction processing unit 100 may determine that predicting sub-blocks of the current block using affine motion prediction yields the best RD performance of the various tested prediction modes.

Video encoder 20 may then determine affine motion for corner sub-blocks of the current block (202). For example, inter-prediction processing unit 120 may perform a motion search for each of the sub-blocks to determine motion information for each of the sub-blocks of the current block, including the corner sub-blocks (e.g., blocks A, B, C, and D of FIG. 12). The motion information may be four parameter affine motion or six parameter affine motion as explained above. Inter-prediction processing unit 120 may also encode motion information using motion information of neighboring blocks as explained above, e.g., with respect to FIGS. 2, 4, and 5.

Video encoder 20 also uses the affine motion for the corner sub-blocks to determine reference blocks for the corner blocks (204). Video encoder 20 then determines a single reference block including all of the reference blocks (206), e.g., such that the single reference block has corners that correspond to respective corners of the reference blocks for the corner blocks. Having corners that correspond to the respective corners of the reference blocks may include, for example, having one or more corners of the single reference block that directly overlap with one or more corners of the reference blocks for the corner sub-blocks. Alternatively, the corners of the single reference block may correspond to corners of the reference blocks for the four corner sub-blocks by way of a mathematical relationship, e.g., a certain number of samples above, below, to the left, or to the right (e.g., N or N−1).

Inter-prediction processing unit 120 may then retrieve data of the single reference block (208), e.g., from decoded picture buffer 116 to be loaded into one or more local memory units (not shown) of prediction processing unit 100. Inter-prediction processing unit 120 may then predict the sub-blocks of the current block from the single reference block (210), rather than individually retrieving reference blocks for the sub-blocks. In this manner, inter-prediction processing unit 120 may reduce bandwidth consumption when performing affine motion prediction of sub-blocks of a current block per the techniques of this disclosure.

Video encoder 20 may then encode the current block using the predicted sub-blocks (212). For example, residual generation unit 102 may form residual blocks for each of the sub-blocks from the current block. Transform processing unit 104 may transform the residual blocks from the spatial domain to the frequency domain, e.g., by applying a DCT or other such transform. Quantization unit 106 may then quantize transform coefficients generated by transform processing unit 104. Entropy encoding unit 118 may then entropy encode the quantized transform coefficients, as well as values for other syntax elements such as, for example, syntax elements indicating a size of the current block, the number of sub-blocks, motion information for the sub-blocks, and the like.

In this manner, the method of FIG. 17 represents an example of a method of coding video data including determining that a block of video data includes a plurality of sub-blocks, each of the sub-blocks having respective motion information referring to respective reference blocks in a reference picture, determining a single reference block of the reference picture, the single reference block including each of the respective reference blocks, wherein determining the single reference block comprises: determining four corner sub-blocks of the block included in the plurality of sub-blocks; and determining the single reference block according to the respective motion information for the four corner sub-blocks such that corners of the single reference block correspond to corners of the respective reference blocks of the four corner sub-blocks, retrieving data of the single reference block from the reference picture, and predicting the sub-blocks from the respective reference blocks using the data of the single reference block.

Figure 18:
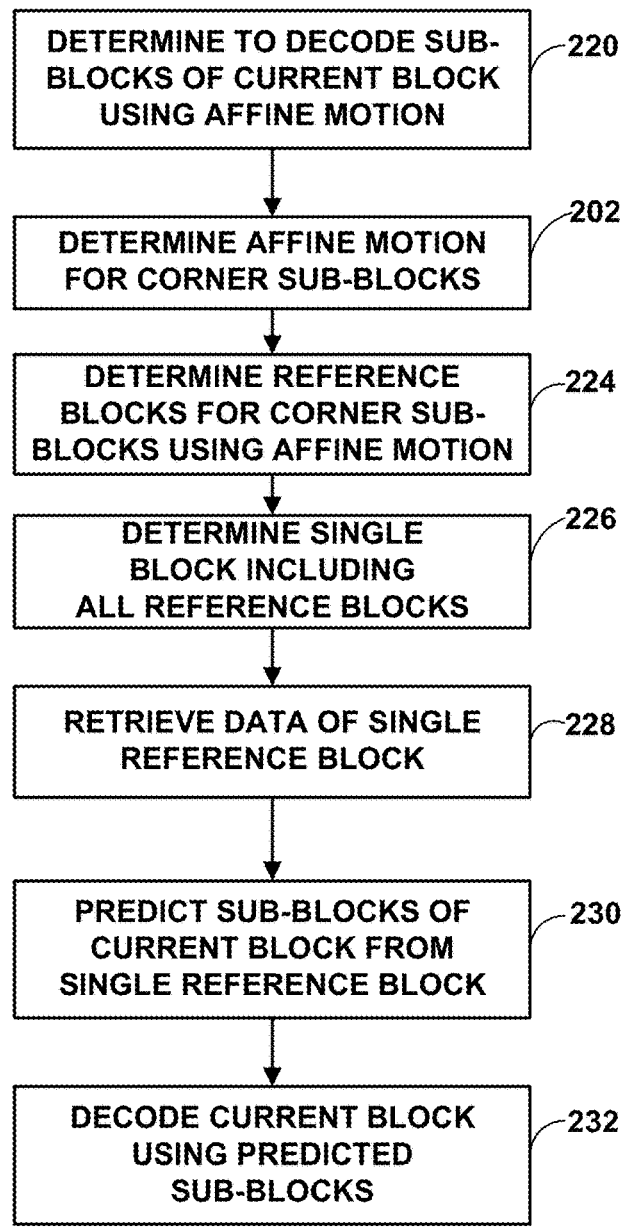
FIG. 18 is a flowchart illustrating an example method for encoding video data in accordance with the techniques of this disclosure.

FIG. 18 is a flowchart illustrating an example method for encoding video data in accordance with the techniques of this disclosure. Although explained with respect to video decoder 30 of FIGS. 1 and 15, it should be understood that other devices may be configured to perform this or a similar method.

Initially, video decoder 30 may determine to encode sub-blocks of a current block using affine motion prediction (220). For example, prediction processing unit 152 may receive data from entropy decoding unit 150 for syntax elements representing that the current block is to be partitioned into sub-blocks that are to be predicted using affine motion prediction. Additionally, prediction processing unit 152 may receive data representing motion information for the sub-blocks, e.g., defining motion using four parameter or six parameter motion models.

Video decoder 30 may then determine affine motion for corner sub-blocks of the current block (222). For example, entropy decoding unit 150 may decode motion information for each of the sub-blocks, including the corner sub-blocks (e.g., blocks A, B, C, and D of FIG. 12). The motion information may be four parameter affine motion or six parameter affine motion as explained above. Entropy decoding unit 150 may also decode motion information using motion information of neighboring blocks as explained above, e.g., with respect to FIGS. 2, 4, and 5.

Video decoder 30 also uses the affine motion for the corner sub-blocks to determine reference blocks for the corner blocks (224). Video decoder 30 then determines a single reference block including all of the reference blocks (226), e.g., such that the single reference block has corners that correspond to respective corners of the reference blocks for the corner blocks. Having corners that correspond to the respective corners of the reference blocks may include, for example, having one or more corners of the single reference block that directly overlap with one or more corners of the reference blocks for the corner sub-blocks. Alternatively, the corners of the single reference block may correspond to corners of the reference blocks for the four corner sub-blocks by way of a mathematical relationship, e.g., a certain number of samples above, below, to the left, or to the right (e.g., N or N−1).

Motion compensation unit 164 may then retrieve data of the single reference block (228), e.g., from decoded picture buffer 162 to be loaded into one or more local memory units (not shown) of prediction processing unit 152. Motion compensation unit 164 may then predict the sub-blocks of the current block from the single reference block (230), rather than individually retrieving reference blocks for the sub-blocks. In this manner, motion compensation unit 164 may reduce bandwidth consumption when performing affine motion prediction of sub-blocks of a current block per the techniques of this disclosure.

Video decoder 30 may then decode the current block using the predicted sub-blocks (232). For example, inverse quantization unit may inverse quantize quantized transform coefficients decoded by entropy decoding unit 150. Inverse transform processing unit 156 may then inverse transform the transform coefficients, to reproduce residual blocks for the sub-blocks of the current block. Reconstruction unit 152 may then add the residual blocks for each of the sub-blocks to the predicted blocks, thereby decoding the sub-blocks. In some examples, filter unit 160 may filter edges of the current block, e.g., outer edges and/or edges between sub-blocks of the current block. Ultimately, video decoder 30 may store the decoded current block into a picture of decoded picture buffer 162 for subsequent output and/or use as a reference block.

In this manner, the method of FIG. 18 represents an example of a method of coding video data including determining that a block of video data includes a plurality of sub-blocks, each of the sub-blocks having respective motion information referring to respective reference blocks in a reference picture, determining a single reference block of the reference picture, the single reference block including each of the respective reference blocks, wherein determining the single reference block comprises: determining four corner sub-blocks of the block included in the plurality of sub-blocks; and determining the single reference block according to the respective motion information for the four corner sub-blocks such that corners of the single reference block correspond to corners of the respective reference blocks of the four corner sub-blocks, retrieving data of the single reference block from the reference picture, and predicting the sub-blocks from the respective reference blocks using the data of the single reference block.

Certain aspects of this disclosure have been described with respect to HEVC or extensions of the HEVC standard for purposes of illustration. However, the techniques described in this disclosure may be useful for other video coding processes, including other standard or proprietary video coding processes not yet developed.

This disclosure describes various constraints that may be added to the affine motion compensation in a video coding draft specification to limit the required bandwidth when using sub-block motion compensation. In general, such constraints allow devices to infer characteristics of a media bitstream, such that events that cannot happen according to the constraint need not be accounted for, e.g., by a data assembler/constructor (such as a content preparation device or server device) or by a data parser (such as a client device, e.g., a file processing unit or decapsulation unit). For example, if a constraint specifies that certain data may only be present when a condition is true, if the condition is false, the constrained data need not be processed. Additionally or alternatively, if the data is present, then the stated condition can be inferred to be true. More particularly, a context-free grammar corresponding to a bitstream may be formed that accounts for the various conditions to specify whether subsequent data corresponds to the constrained data or not. Likewise, a data generation unit and a data parsing unit may be implemented and configured according to the context-free grammar.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining that a block of video data includes a plurality of sub-blocks, each of the sub-blocks having respective motion information;
   determining a respective sub-block, within the block that includes the plurality of sub-blocks, at each respective corner of the block, the determined sub-blocks being four corner sub-blocks;
   determining, within a reference picture, a single reference block according to the respective motion information of each of the four corner sub-blocks such that corners of the single reference block correspond to corners of respective reference blocks, within the single reference block, referred to by the respective motion information of the four corner sub-blocks;
   retrieving data of the single reference block from the reference picture, the single reference block including each of the respective reference blocks; and
   predicting the sub-blocks from the respective reference blocks using the data of the single reference block.

2. The method of claim 1, wherein determining the single reference block comprises determining the single reference block to have a smallest size possible while also including each of the respective reference blocks.

3. The method of claim 1, wherein determining the single reference block comprises:
   determining an upper edge of the single reference block to be equal to a highest upper vertex of the reference blocks for the four corner sub-blocks;
   determining a lower edge of the single reference block to be equal to a lowest lower vertex of the reference blocks for the four corner sub-blocks;
   determining a left edge of the single reference block to be equal to a leftmost vertex of the reference blocks for the four corner sub-blocks; and
   determining a right edge of the single reference block to be equal to a rightmost vertex of the reference blocks for the four corner sub-blocks.

4. The method of claim 1, wherein determining the single reference block comprises determining the single reference block to include additional samples of the reference picture beyond vertices of at least one of the reference blocks for the four corner sub-blocks.

5. The method of claim 1, wherein determining the single reference block comprises determining the single reference block to be no larger than an allowable maximum size, wherein the allowable maximum size is predetermined, signaled in a parameter set, or determined based on characteristics of the block of video data.

6. The method of claim 1, wherein predicting the sub-blocks comprises forming prediction blocks for the sub-blocks from the respective reference blocks, the method further comprising decoding the sub-blocks using the prediction blocks.

7. The method of claim 1, wherein predicting the sub-blocks comprises forming prediction blocks for the sub-blocks from the respective reference blocks, the method further comprising encoding the sub-blocks using the prediction blocks.

8. A device for coding video data, the device comprising:
   a memory configured to store video data; and
   a processing unit implemented in circuitry and configured to:
      determine that a block of the video data includes a plurality of sub-blocks, each of the sub-blocks having respective motion information;
      determine a respective sub-block, within the bloc that includes the plurality of sub-blocks, at each respective corner of the block, the determined sub-blocks being four corner sub-blocks;

determine, within a reference picture stored in the memory, a single reference block according to the respective motion information of each of the four corner sub-blocks such that corners of the single reference block correspond to corners of respective reference blocks, within the single reference block, referred to by the respective motion information of the four corner sub-blocks;

retrieve data of the single reference block from the reference picture stored in the memory, the single reference block including each of the respective reference blocks; and predict the sub-blocks from the respective reference blocks using the data of the single reference block.

9. The device of claim 8, wherein the processing unit is configured to determine the single reference block to have a smallest size possible while also including each of the respective reference blocks.

10. The device of claim 8, wherein to determine the single reference block, the processing unit is configured to:
determine an upper edge of the single reference block to be equal to a highest upper vertex of the reference blocks for the four corner sub-blocks;
determine a lower edge of the single reference block to be equal to a lowest lower vertex of the reference blocks for the four corner sub-blocks;
determine a left edge of the single reference block to be equal to a leftmost vertex of the reference blocks for the four corner sub-blocks; and
determine a right edge of the single reference block to be equal to a rightmost vertex of the reference blocks for the four corner sub-blocks.

11. The device of claim 8, wherein the processing unit is configured to determine the single reference block to include additional samples of the reference picture beyond vertices of at least one of the reference blocks for the four corner sub-blocks.

12. The device of claim 8, wherein the single processing unit is configured to determine the single reference block to be no larger than an allowable maximum size, wherein the allowable maximum size is predetermined, signaled in a parameter set, or determined based on characteristics of the block of video data.

13. The device of claim 8, wherein to predict the sub-blocks, the processing unit is configured to form prediction blocks for the sub-blocks from the respective reference blocks, wherein the processing unit is further configured to decode the sub-blocks using the prediction blocks.

14. The device of claim 8, wherein to predict the sub-blocks, the processing unit is configured to form prediction blocks for the sub-blocks from the respective reference blocks, wherein the processing unit is further configured to encode the sub-blocks using the prediction blocks.

15. The device of claim 8, further comprising a display configured to display the video data.

16. The device of claim 8, wherein the device comprises one or more of a camera, a computer, a mobile device, a broadcast receiver device, or a set-top box.

17. A device for coding video data, the device comprising:
means for determining that a block of video data includes a plurality of sub-blocks, each of the sub-blocks having respective motion information;
means for determining a respective sub-block, within the block that includes the plurality of sub-blocks, at each respective corner of the block, the determined sub-blocks being four corner sub-blocks; and means for determining, within a reference picture, a single reference block according to the respective motion information of each of the four corner sub-blocks such that corners of the single reference block correspond to corners of respective reference blocks, within the single reference block, referred to by the respective motion information of the four corner sub-blocks;

means for retrieving data of the single reference block from the reference picture, the single reference block including each of the respective reference blocks; and means for predicting the sub-blocks from the respective reference blocks using the data of the single reference block.

18. The device of claim 17, wherein the means for determining the single reference block comprises means for determining the single reference block to have a smallest size possible while also including each of the respective reference blocks.

19. The device of claim 17, wherein the means for determining the single reference block comprises:
means for determining an upper edge of the single reference block to be equal to a highest upper vertex of the reference blocks for the four corner sub-blocks;
means for determining a lower edge of the single reference block to be equal to a lowest lower vertex of the reference blocks for the four corner sub-blocks;
means for determining a left edge of the single reference block to be equal to a leftmost vertex of the reference blocks for the four corner sub-blocks; and
means for determining a right edge of the single reference block to be equal to a rightmost vertex of the reference blocks for the four corner sub-blocks.

20. The device of claim 17, wherein the means for determining the single reference block comprises means for determining the single reference block to include additional samples of the reference picture beyond vertices of at least one of the reference blocks for the four corner sub-blocks.

21. The device of claim 17, wherein the means for determining the single reference block comprises means for determining the single reference block to be no larger than an allowable maximum size, wherein the allowable maximum size is predetermined, signaled in a parameter set, or determined based on characteristics of the block of video data.

22. The device of claim 17, wherein the means for predicting the sub-blocks comprises means for forming prediction blocks for the sub-blocks from the respective reference blocks, further comprising means for decoding the sub-blocks using the prediction blocks.

23. The device of claim 17, wherein the means for predicting the sub-blocks comprises means for forming prediction blocks for the sub-blocks from the respective reference blocks, the method further comprising means for encoding the sub-blocks using the prediction blocks.

24. A computer-readable storage medium having stored thereon instructions that, when executed, cause a processor of a device for decoding video data to:
determine that a block of video data includes a plurality of sub-blocks, each of the sub-blocks having respective motion information;
determine a respective sub-block, within the block that includes the plurality of sub-blocks, at each respective corner of the block, the determined sub-blocks being four corner sub-blocks;

determine, within a reference picture, a single reference block according to the respective motion information of each of the four corner sub-blocks such that corners of the single reference block correspond to corners of respective reference blocks, within the single reference block, referred to by the respective motion information of the four corner sub-blocks;

retrieve data of the single reference block from the reference picture, the single reference block including each of the respective reference blocks; and predict the sub-blocks from the respective reference blocks using the data of the single reference block.

25. The computer-readable storage medium of claim 24, wherein the instructions that cause the processor to determine the single reference block comprise instructions that cause the processor to determine the single reference block to have a smallest size possible while also including each of the respective reference blocks.

26. The computer-readable storage medium of claim 24, wherein the instructions that cause the processor to determine the single reference block comprise instructions that cause the processor to:

determine an upper edge of the single reference block to be equal to a highest upper vertex of the reference blocks for the four corner sub-blocks;

determine a lower edge of the single reference block to be equal to a lowest lower vertex of the reference blocks for the four corner sub-blocks;

determine a left edge of the single reference block to be equal to a leftmost vertex of the reference blocks for the four corner sub-blocks; and determine a right edge of the single reference block to be equal to a rightmost vertex of the reference blocks for the four corner sub-blocks.

27. The computer-readable storage medium of claim 24, wherein the instructions that cause the processor to determine the single reference block comprise instructions that cause the processor to determine the single reference block to include additional samples of the reference picture beyond vertices of at least one of the reference blocks for the four corner sub-blocks.

28. The computer-readable storage medium of claim 24, wherein the instructions that cause the processor to determine the single reference block comprise instructions that cause the processor to determine the single reference block to be no larger than an allowable maximum size, wherein the allowable maximum size is predetermined, signaled in a parameter set, or determined based on characteristics of the block of video data.

29. The computer-readable storage medium of claim 24, wherein the instructions that cause the processor to predict the sub-blocks comprise instructions that cause the processor to form prediction blocks for the sub-blocks from the respective reference blocks, further comprising instructions that cause the processor to decode the sub-blocks using the prediction blocks.

30. The computer-readable storage medium of claim 24, wherein the instructions that cause the processor to predict the sub-blocks comprise instructions that cause the processor to form prediction blocks for the sub-blocks from the respective reference blocks, further comprising instructions that cause the processor to encode the sub-blocks using the prediction blocks.

* * * * *